United States Patent
Tao et al.

(10) Patent No.: US 12,413,885 B2
(45) Date of Patent: Sep. 9, 2025

(54) SOUND COLLECTING METHOD, ELECTRONIC DEVICE, AND SYSTEM

(71) Applicant: Huawei Technologies Co., Ltd., Shenzhen (CN)

(72) Inventors: Kai Tao, Shanghai (CN); Mingjie Yin, Shanghai (CN); Qing Chang, Shanghai (CN); Yao Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 18/259,528

(22) PCT Filed: Dec. 13, 2021

(86) PCT No.: PCT/CN2021/137406
§ 371 (c)(1),
(2) Date: Jun. 27, 2023

(87) PCT Pub. No.: WO2022/143119
PCT Pub. Date: Jul. 7, 2022

(65) Prior Publication Data
US 2024/0064449 A1    Feb. 22, 2024

(30) Foreign Application Priority Data
Dec. 29, 2020    (CN) .......................... 202011593358.1

(51) Int. Cl.
| | | |
|---|---|---|
| H04R 1/08 | (2006.01) | |
| G06V 40/16 | (2022.01) | |
| H04R 1/10 | (2006.01) | |
| H04S 7/00 | (2006.01) | |

(52) U.S. Cl.
CPC ............. *H04R 1/08* (2013.01); *G06V 40/166* (2022.01); *H04R 1/1091* (2013.01); *H04S 7/303* (2013.01); *H04R 2410/03* (2013.01)

(58) Field of Classification Search
CPC ..... G06F 21/32; G10L 15/25; G10L 21/0208; G10L 21/02; H04R 3/005; H04R 2201/401; H04R 29/005; H04R 1/222
See application file for complete search history.

(56) References Cited

U.S. PATENT DOCUMENTS
2012/0128166 A1    5/2012    Kim et al.

FOREIGN PATENT DOCUMENTS

| CN | 110191388 A | 8/2019 | |
|---|---|---|---|
| CN | 210868121 U | 6/2020 | |
| CN | 110121129 B | 4/2021 | |
| CN | 113284504 A * | 8/2021 | ........... G01S 3/8036 |

* cited by examiner

*Primary Examiner* — Kile O Blair
(74) *Attorney, Agent, or Firm* — Conley Rose, P.C.

(57) ABSTRACT

A sound collecting system includes a first electronic device, a left-ear TWS earphone, and a right-ear TWS earphone. Microphones of the first electronic device, the left-ear TWS earphone, and the right-ear TWS earphone form a first microphone array. When the first electronic device detects a user operation of starting video recording, the first microphone array performs sound collecting to obtain a joint microphone array signal. The first electronic device performs noise reduction processing on the joint microphone array signal.

20 Claims, 17 Drawing Sheets

SOUND COLLECTING METHOD, ELECTRONIC DEVICE, AND SYSTEM

CROSS-REFERENCE TO RELATED APPLICATIONS

This is a U.S. National Stage of International Patent Application No. PCT/CN2021/137406 filed on Dec. 13, 2021, which claims priority to Chinese Patent Application No. 202011593358.1 filed on Dec. 29, 2020. Both of the aforementioned applications are hereby incorporated by reference in their entireties.

TECHNICAL FIELD

This application relates to the field of terminal technologies, and in particular, to a sound collecting method, an electronic device, and a system.

BACKGROUND

With the development of Bluetooth technologies, a true wireless stereo (true wireless stereo, TWS) headset can transmit audio signals with electronic devices such as a mobile phone and a tablet computer more efficiently and with high quality, and is favored by more users. In video recording scenarios such as live broadcast and video blog (video flog, vlog) shooting, a user may collect sound by using a microphone of a TWS headset.

However, when a video is recorded in a noisy environment, an existing sound pickup noise reduction solution used by a TWS headset is affected by a limitation of a quantity of microphones in the headset and a user wearing posture. The TWS headset has a poor effect in suppressing ambient noise and enhancing the target sound.

SUMMARY

This application provides a sound collecting method, an electronic device, and a system, so that when a user wears a wireless headset and uses a first electronic device to record a video, the wireless headset and a microphone of the first electronic device can be used to perform sound collecting. The first electronic device may perform noise reduction processing on audio signals obtained by using a plurality of microphones, to improve sound quality in a recorded video.

According to a first aspect, this application provides a sound collecting method. The method may be applied to a first electronic device with a first microphone, a left-ear wireless earphone with a second microphone, and a right-ear wireless earphone with a third microphone. The first electronic device is connected to the left-ear wireless earphone and the right-ear wireless earphone through wireless communication. The method may include: The first electronic device collects a face image. The first electronic device may determine relative locations of the first microphone, the second microphone, and the third microphone based on the face image and posture information of the first electronic device. The first electronic device may obtain a first audio signal of the first microphone, a second audio signal of the second microphone, and a third audio signal of the third microphone. The first electronic device may perform noise reduction processing on the first audio signal, the second audio signal, and the third audio signal based on the relative locations.

The first microphone, the second microphone, and the third microphone may form a first microphone array. The first microphone may include one or more microphones in the first electronic device. The second microphone may include one or more microphones in the left-ear wireless earphone. The third microphone may include one or more microphones in the right-ear wireless earphone.

It can be learned from a location of each microphone in the first microphone array that a near field area formed by the first microphone array includes an area in which a user wearing a TWS headset and the first electronic device 100 are located. Compared with a microphone array in a single TWS earphone, the first microphone array has a larger size and a stronger spatial resolution capability, and can more accurately distinguish a target sound in the near field area and the ambient noise from a far field area. In this way, the first electronic device 100 can better enhance the target sound and suppress the ambient noise when performing spatial filtering on the audio signal collected by the first microphone array, to improve sound quality in a recorded video.

In addition, adding the microphone in the first electronic device 100 to the microphone array can reduce impact of a posture of wearing the TWS headset by the user on enhancing the target sound and reducing the ambient noise by the first electronic device 100.

The target sound may be a sound whose sound source is located in the near field area of the first microphone array. The target sound may include a voice of the user and a sound of playing a musical instrument by the user.

With reference to the first aspect, in some embodiments, before performing noise reduction processing on the first audio signal, the second audio signal, and the third audio signal based on the relative locations, the first electronic device may further perform delay alignment on the first audio signal, the second audio signal, and the third audio signal.

Specifically, the first electronic device may emit an alignment sound. The aligned sound is obtained by performing digital-to-analog conversion on an alignment signal. The first electronic device may perform delay correlation detection on a first alignment signal part of the first audio signal, a second alignment signal part of the second audio signal, and a third alignment signal part of the third audio signal, to determine delay lengths between the first audio signal, the second audio signal, and the third audio signal. The first electronic device may perform delay alignment on the first audio signal, the second audio signal, and the third audio signal based on the delay lengths.

The alignment signal may be an audio signal with a frequency higher than 20000 Hz. An audible frequency band of a human ear ranges from 20 Hz to 20000 Hz. If the frequency of the alignment signal is higher than 20000 Hz, and the alignment sound is not heard by the user. This can avoid interference of the alignment sound to the user.

The delay alignment may determine data that is collected at a same time point in the first audio signal, the second audio signal, and the third audio signal, to reduce impact of a delay difference on noise reduction processing performed by the first electronic device.

In a possible implementation, the first electronic device may use any one of the first audio signal, the second audio signal, and the third audio signal as a reference audio signal, and perform delay alignment on another audio signal and the reference audio signal. For example, the first electronic device may use the first audio signal as a reference audio signal. The first electronic device may perform high-pass filtering on the first audio signal, the second audio signal, and the third audio signal, to obtain alignment signal parts in these audio signals. The first electronic device may perform delay processing of different time lengths on the alignment signal parts in the second audio signal and the third audio signal, to determine delay lengths at which a correlation between the alignment signal parts of the second audio signal and the third audio signal and the alignment signal part of the first audio signal is the highest. In this way, the first electronic device may determine the delay lengths of the second audio signal and the third audio signal relative to the first audio signal.

In a possible implementation, the first electronic device may generate the alignment signal in a preset time period (for example, a preset time period before video recording starts or a preset time period after video recording starts) for starting video recording, and emit the alignment sound. The first electronic device may determine the delay lengths between the first audio signal, the second audio signal, and the third audio signal based on the alignment signal of the preset time period. The delay lengths generally do not change or change Very little in a video recording process of the first electronic device. In a video recording process after the preset time period, the first electronic device may perform delay alignment on the first audio signal, the second audio signal, and the third audio signal based on the delay lengths. In addition, the first electronic device may stop generating the alignment signal, to save power consumption of the first electronic device.

With reference to the first aspect, in some embodiments, the relative locations of the first microphone, the second microphone, and the third microphone may include coordinates of the first microphone, the second microphone, and the third microphone in a world coordinate system.

The first electronic device may determine a first conversion relationship between a standard head coordinate system and a first electronic device coordinate system based on a correspondence between coordinates of a first human face key point in the standard head coordinate system and coordinates of the first human face key point in a face image coordinate system. The standard head coordinate system is determined based on a standard head model. The first electronic device may store coordinates of each key point in the standard head model in the standard head coordinate system. The first electronic device may determine coordinates of a left ear and a right ear in the standard head model in the first electronic device coordinate system based on the first conversion relationship and coordinates of the left ear and the right ear in the standard head model in the standard head coordinate system. The coordinates of the left ear and the right ear in the standard head model in the first electronic device coordinate system are respectively coordinates of the second microphone and the third microphone in the first electronic device coordinate system. The first electronic device may determine a second conversion relationship between the first electronic device coordinate system and the world coordinate system based on the posture information of the first electronic device. The first electronic device may be based on the second conversion relationship, and coordinates (that is, the foregoing relative locations) of the first microphone, the second microphone, and the third microphone in the first electronic device coordinate system.

The standard head coordinate system may be a three-dimensional coordinate system established by using a location of a nose tip in the standard head model as an origin, using a direction perpendicular to a face as a direction of an x-axis, using a horizontal direction parallel to the face as a direction of a y-axis, and using a vertical direction parallel to the face as a direction of a z-axis.

The first face key point may include any plurality of key points of an area in which the face is located in the face image, for example, a key point in an area in which a forehead area is located, a key point in an area in which a cheek is located, and a key point in an area in which a lip is located.

The posture information may be determined by the first electronic device by using a posture sensor (for example, an acceleration sensor or a gyroscope sensor).

A placement posture of the first electronic device is unknown and time-varying. The target sound that needs to be collected by the first microphone array includes the voice of the user, and may include the sound of playing a musical instrument by the user. Compared with coordinates of each microphone in the first microphone array in the electronic device coordinate system, that the first electronic device uses the coordinates of each microphone in the first microphone array in the world coordinate system in the spatial filtering process can better improve an effect of enhancing the target sound and reducing the ambient noise.

With reference to the first aspect, in some embodiments, a method for performing, by the first electronic device, noise reduction processing on the first audio signal, the second audio signal, and the third audio signal based on the relative locations may specifically include: The first electronic device may perform voice activity detection on the first audio signal, the second audio signal, and the third audio signal based on the relative locations. The voice activity detection is used to determine a frequency point of a target sound signal and a frequency point of an ambient noise signal in the first audio signal, the second audio signal, and the third audio signal. The first electronic device may update a noise spatial characteristic of ambient noise based on the frequency point of the target sound signal and the frequency point of the ambient noise signal. The noise spatial characteristic indicates spatial distribution of the ambient noise. The spatial distribution of the ambient noise includes a direction and energy of the ambient noise. The first electronic device may determine a target steering vector of the first audio signal, the second audio signal, and the third audio signal based on the relative locations. The target steering vector may indicate a direction of the target sound signal. The first electronic device may determine a spatial filter based on the noise spatial characteristic and the target steering vector, and perform spatial filtering on the first audio signal, the second audio signal, and the third audio signal by using the spatial filter, to enhance the target sound signal in the first audio signal, the second audio signal, and the third audio signal and suppress the ambient noise signal in the first audio signal, the second audio signal, and the third audio signal.

With reference to the first aspect, in some embodiments, the left-ear wireless earphone may perform wearing detection. The wearing detection may be used to determine whether the left-ear wireless earphone is in an in-ear state. When the left-ear wireless earphone is in the in-ear state, the left-ear wireless earphone obtains the second audio signal by using the second microphone. The right-ear wireless earphone may perform the wearing detection. When the right-ear wireless earphone is in the in-ear state, the right-ear wireless earphone obtains the third audio signal by using the third microphone.

In a possible implementation, when detecting a user operation used to start video recording, the first electronic device may query a wearing detection result from the left-ear wireless earphone and the right-ear wireless earphone. When it is determined that both the left-ear wireless earphone and the right-ear wireless earphone are in the in-ear state, the first electronic device may turn on the first microphone, and send a microphone turn-on instruction to the left-ear wireless earphone and the right-ear wireless earphone. When receiving the microphone turn-on instruction from the first electronic device, the left-ear wireless earphone and the right-ear wireless earphone may respectively turn on the second microphone and the third microphone.

In another possible implementation, the left-ear wireless earphone may turn on the second microphone when performing the wearing detection and determining that the left-ear wireless earphone is in the in-ear state. The right-ear wireless earphone may turn on the third microphone when performing wearing detection and determining that the right-ear wireless earphone is in the in-ear state. That is, the first electronic device may not need to send the microphone turn-on instruction to the left-ear wireless earphone and the right-ear wireless earphone.

With reference to the first aspect, in some embodiments, the first electronic device may mix a first video and a fourth audio signal that are collected in a first time period. The fourth audio signal may be an audio signal obtained after the noise reduction processing is performed on the first audio signal, the second audio signal, and the third audio signal. The first audio signal, the second audio signal, and the third audio signal are respectively obtained in the first time period by using the first microphone, the second microphone, and the third microphone.

In some embodiments, a microphone of one of the left-ear wireless earphone and the right-ear wireless earphone may form a microphone array with the microphone of the first electronic device. The microphone array may also be applicable to the sound collecting method provided in embodiments of this application. For example, in a scenario in which the user wears the left-ear wireless earphone and the right-ear wireless earphone and uses the first electronic device for live broadcast, the first microphone of the first electronic device and the second microphone of the left-ear wireless earphone may perform sound collecting. The first electronic device may obtain the first audio signal by using the first microphone. The left-ear wireless earphone may obtain the second audio signal by using the second microphone. The left-ear wireless earphone may send the second audio signal to the first electronic device. The first electronic device may perform noise reduction processing on the first audio signal and the second audio signal, to obtain an audio signal in a live video.

A near field area of the microphone array formed by the microphone of one earphone and the microphone of the first electronic device may still include a location of a sound source of a target sound, such as a user voice or a sound of playing a musical instrument by the user. In addition, using the microphone of one earphone can reduce power consumption of the headset.

According to a second aspect, this application further provides a sound collecting method. The method is applied to a first electronic device with a first microphone. The first electronic device is connected to a left-ear wireless earphone with a second microphone and a right-ear wireless earphone with a third microphone through wireless communication. The method may include: The first electronic device collects a face image. The first electronic device determines relative locations of the first microphone, the second microphone, and the third microphone based on the face image and posture information of the first electronic device. The first electronic device obtains a first audio signal of the first microphone, a second audio signal of the second microphone, and a third audio signal of the third microphone. The first electronic device performs noise reduction processing on the first audio signal, the second audio signal, and the third audio signal based on the relative locations.

The first microphone, the second microphone, and the third microphone may form a first microphone array. The first microphone may include one or more microphones in the first electronic device. The second microphone may include one or more microphones in the left-ear wireless earphone. The third microphone may include one or more microphones in the right-ear wireless earphone.

It can be learned from a location of each microphone in the first microphone array that a near field area formed by the first microphone array includes an area in which a user wearing a TWS headset and the first electronic device 100 are located. Compared with a microphone array in a single TWS earphone, the first microphone array has a larger size and a stronger spatial resolution capability, and can more accurately distinguish a target sound in the near field area and ambient noise from a far field area. In this way, the first electronic device 100 can better enhance the target sound and suppress the ambient noise when performing spatial filtering on the audio signal collected by the first microphone array, to improve sound quality in a recorded video.

In addition, adding the microphone in the first electronic device 100 to the microphone array can reduce impact of a posture of wearing the TWS headset by the user on enhancing the target sound and reducing the ambient noise by the first electronic device 100.

The target sound may be a sound whose sound source is located in the near field area of the first microphone array. The target sound may include a voice of the user and a sound of playing a musical instrument by the user.

With reference to the first aspect, in some embodiments, before performing noise reduction processing on the first audio signal, the second audio signal, and the third audio signal based on the relative locations, the first electronic device may further perform delay alignment on the first audio signal, the second audio signal, and the third audio signal.

Specifically, the first electronic device may emit an alignment sound. The aligned sound is obtained by performing digital-to-analog conversion on an alignment signal. The first electronic device may perform delay correlation detection on a first alignment signal part of the first audio signal, a second alignment signal part of the second audio signal, and a third alignment signal part of the third audio signal, to determine delay lengths between the first audio signal, the second audio signal, and the third audio signal. The first electronic device may perform delay alignment on the first audio signal, the second audio signal, and the third audio signal based on the delay lengths.

The alignment signal may be an audio signal with a frequency higher than 20000 Hz. An audible frequency band of a human ear ranges from 20 Hz to 20000 Hz. If the frequency of the alignment signal is higher than 20000 Hz, and the alignment sound is not heard by the user. This can avoid interference of the alignment sound to the user.

The delay alignment may determine data that is collected at a same time point in the first audio signal, the second audio signal, and the third audio signal, to reduce impact of a delay difference on noise reduction processing performed by the first electronic device.

With reference to the second aspect, in some embodiments, the relative locations of the first microphone, the second microphone, and the third microphone may include coordinates of the first microphone, the second microphone, and the third microphone in a world coordinate system.

The first electronic device may determine a first conversion relationship between a standard head coordinate system and a first electronic device coordinate system based on a correspondence between coordinates of a first human face key point in the standard head coordinate system and coordinates of the first human face key point in a face image coordinate system. The standard head coordinate system is determined based on a standard head model. The first electronic device may store coordinates of each key point in the standard head model in the standard head coordinate system. The first electronic device may determine coordinates of a left ear and a right ear in the standard head model in the first electronic device coordinate system based on the first conversion relationship and coordinates of the left ear and the right ear in the standard head model in the standard head coordinate system. The coordinates of the left ear and the right ear in the standard head model in the first electronic device coordinate system are respectively coordinates of the second microphone and the third microphone in the first electronic device coordinate system. The first electronic device may determine a second conversion relationship between the first electronic device coordinate system and the world coordinate system based on the posture information of the first electronic device. The first electronic device may be based on the second conversion relationship, and coordinates (that is, the foregoing relative locations) of the first microphone, the second microphone, and the third microphone in the first electronic device coordinate system.

A placement posture of the first electronic device is unknown and time-varying. The target sound that needs to be collected by the first microphone array includes the voice of the user, and may include the sound of playing a musical instrument by the user. Compared with coordinates of each microphone in the first microphone array in the electronic device coordinate system, that the first electronic device uses the coordinates of each microphone in the first microphone array in the world coordinate system in the spatial filtering process can better improve an effect of enhancing the target sound and reducing the ambient noise.

With reference to the second aspect, in some embodiments, a method for performing, by the first electronic device, noise reduction processing on the first audio signal, the second audio signal, and the third audio signal based on the relative locations may specifically include: The first electronic device may perform voice activity detection on the first audio signal, the second audio signal, and the third audio signal based on the relative locations. The voice activity detection is used to determine a frequency point of a target sound signal and a frequency point of an ambient noise signal in the first audio signal, the second audio signal, and the third audio signal. The first electronic device may update a noise spatial characteristic of ambient noise based on the frequency point of the target sound signal and the frequency point of the ambient noise signal. The noise spatial characteristic indicates spatial distribution of the ambient noise. The spatial distribution of the ambient noise includes a direction and energy of the ambient noise. The first electronic device may determine a target steering vector of the first audio signal, the second audio signal, and the third audio signal based on the relative locations. The target steering vector may indicate a direction of the target sound signal. The first electronic device may determine a spatial filter based on the noise spatial characteristic and the target steering vector, and perform spatial filtering on the first audio signal, the second audio signal, and the third audio signal by using the spatial filter, to enhance the target sound signal in the first audio signal, the second audio signal, and the third audio signal and suppress the ambient noise signal in the first audio signal, the second audio signal, and the third audio signal.

With reference to the second aspect, in some embodiments, the first electronic device may mix a first video and a fourth audio signal that are collected in a first time period. The fourth audio signal may be an audio signal obtained after the noise reduction processing is performed on the first audio signal, the second audio signal, and the third audio signal. The first audio signal, the second audio signal, and the third audio signal may all be audio signals collected in the first time period.

According to a third aspect, this application provides an electronic device. The electronic device may include a communication apparatus, a camera, a microphone, a memory, and a processor. The communication apparatus may be configured to establish a communication connection to a wireless headset. The camera may be configured to collect an image. The microphone may be configured to perform sound collecting. The memory may be configured to store a standard head coordinate system and a computer program. The processor may be configured to invoke the computer program, so that the electronic device performs any possible implementation of the second aspect.

According to a fourth aspect, this application provides a computer storage medium, including instructions. When the instructions are run on an electronic device, the electronic device performs any possible implementation of the first aspect or the electronic device performs any possible implementation of the second aspect.

According to a fifth aspect, an embodiment of this application provides a chip. The chip is applied to an electronic device, the chip includes one or more processors, and the processor is configured to invoke computer instructions, so that the electronic device performs any one possible implementation of the first aspect, or the electronic device performs any possible implementation of the second aspect.

According to a sixth aspect, an embodiment of this application provides a computer program product including instructions. When the computer program product runs on a device, the foregoing electronic device performs any possible implementation of the first aspect, or the electronic device performs any possible implementation of the second aspect.

It may be understood that the electronic device provided in the third aspect, the computer storage medium provided in the fourth aspect, the chip provided in the fifth aspect, and the computer program product provided in the sixth aspect are all configured to perform the method provided in embodiments of this application. Therefore, for beneficial effects that can be achieved, refer to beneficial effects in a corresponding method. Details are not described herein again.

DESCRIPTION OF EMBODIMENTS

Technical solutions according to embodiments of this application are clearly and completely described in the following with reference to accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Figure 1A:
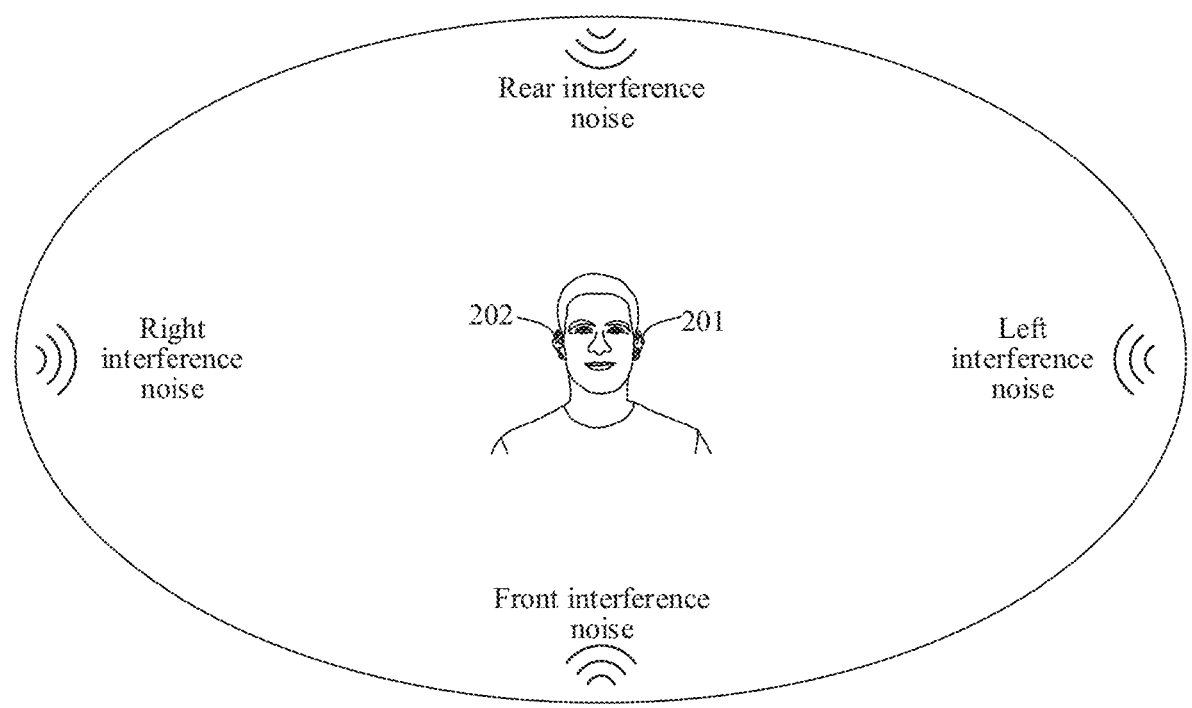
FIG. 1A is a schematic diagram of a sound collecting scenario according to an embodiment of this application.

In some embodiments, a first electronic device (such as a mobile phone or a tablet computer) establishes a communication connection to a TWS headset. In a scenario such as video recording or a voice call, the first electronic device may collect a sound by using a microphone of the TWS headset. As shown in FIG. 1A, the TWS headset may collect a sound by using a microphone array of one of a left-ear TWS earphone 201 or a right-ear TWS earphone 202. The sound collected by the TWS headset usually includes ambient noise. The foregoing ambient noise mainly comes from a far field area of a microphone array in a single TWS earphone. The ambient noise may be interference noise in a plurality of directions such as front interference noise, rear interference noise, left interference noise, and right interference noise of the TWS earphone. The first electronic device may perform spatial filtering on an audio signal collected by the microphone array in the single TWS headset, to suppress ambient noise and enhance a target sound in a near field area. However, a size of the TWS headset is limited. The near field area of the microphone array in the single TWS earphone is very small. A sound making location of a user mouth is already located in the far field area of the microphone array in the single TWS earphone. In this case, it is difficult for the first electronic device to distinguish between user voice and ambient noise in a same direction in the audio signal collected by the microphone array in the single TWS earphone.

Figure 1B:
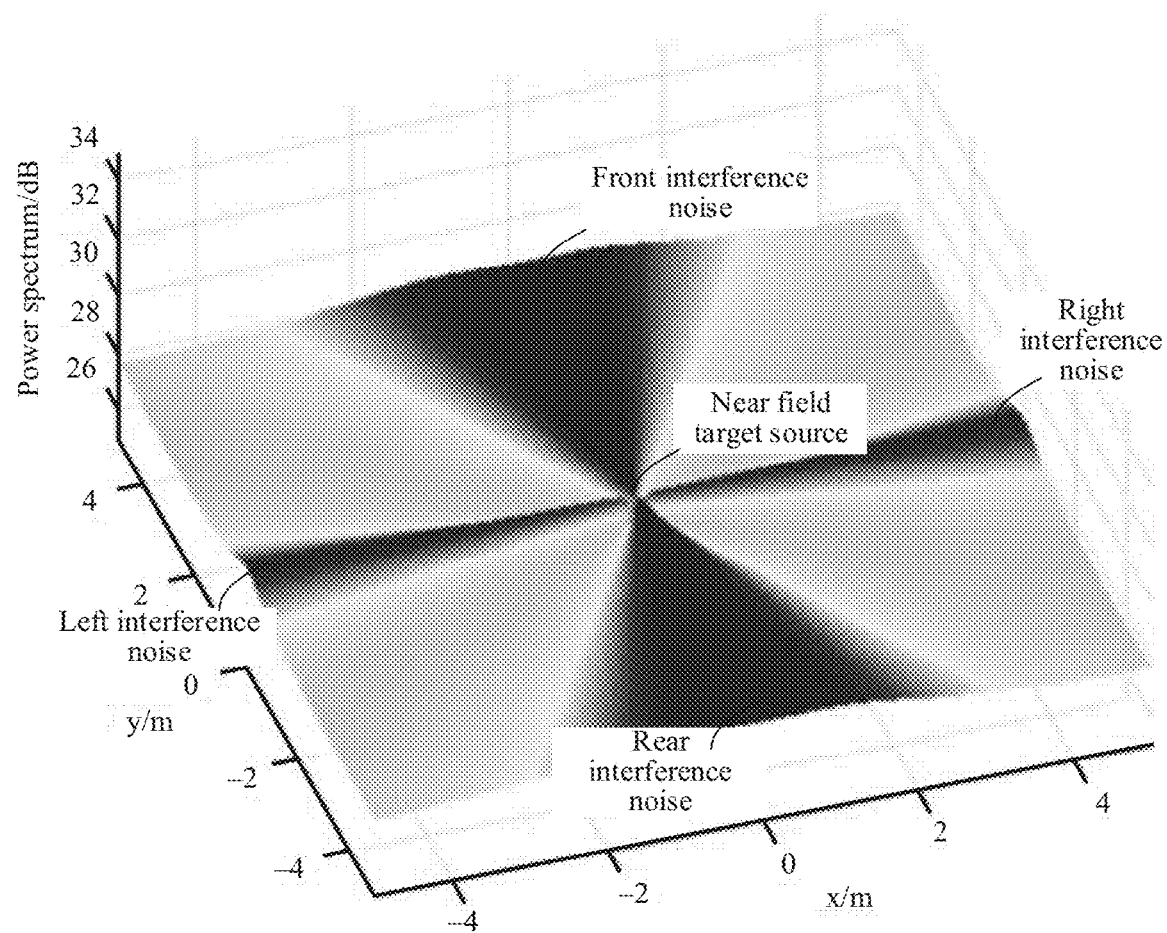
FIG. 1B is a schematic diagram of a spatial resolution capability of a microphone array according to an embodiment of this application.

FIG. 1B shows an example of a spatial resolution capability of a microphone array of a single TWS earphone. Because a distance between microphones in the microphone array of the single TWS earphone is short, a size of the microphone array is insufficient, and the spatial resolution capability of the microphone array of the single TWS earphone is weak. A near field target source of the microphone array of the single TWS earphone often cannot include a sound source from a user voice. When a first electronic device performs spatial filtering, it is difficult to effectively enhance the user voice by enhancing the near field target source. In addition, an orientation of the microphone array of the single TWS earphone is easily affected by a user wearing posture, which leads to a deviation of a beam main lobe direction from a user mouth direction during spatial filtering. A sound pickup capability of the microphone array of the single TWS earphone is further weakened. In addition, the microphone array of the single TWS earphone is limited by a size constraint, and a spatial spectral peak of a determined spatial spectrum of the sound source is wide. A target source signal is easily shielded by an ambient noise signal. It is difficult for the microphone array in the single TWS earphone to accurately distinguish the target source from ambient noise. When the first electronic device performs spatial filtering on an audio signal collected by the microphone array in the single TWS earphone, an effect of suppressing the ambient noise and enhancing the user voice by the first electronic device is poor. In a video recorded by the first electronic device, ambient noise is large, and a user voice is not clear enough.

Figure 2A:
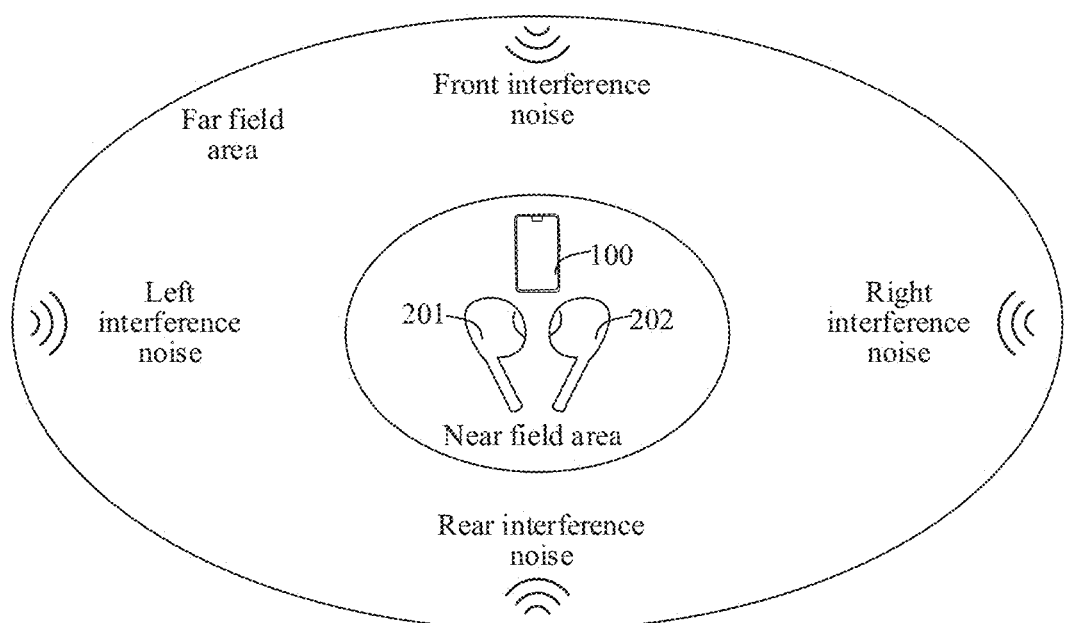
FIG. 2A is a schematic diagram of another sound collecting scenario according to an embodiment of this application.

This application provides a sound collecting method. According to the method, when a communication connection is established between a TWS headset and a first electronic device 100 (such as a mobile phone or a tablet computer), and the first electronic device 100 records a video, a target sound may be enhanced, and ambient noise may be suppressed, to improve sound quality in the recorded video. Specifically, as shown in FIG. 2A, a microphone of the first electronic device 100 and microphones of left-ear and right-ear TWS earphones may form a first microphone array. The target sound is a sound of a sound source in a near field area of the first microphone array. The target sound may be, for example, a user voice or a sound of playing a musical instrument by the user. A size of the first microphone array is large. The near field area of the first microphone array may include an area formed by locations at which a user and the first electronic device 100 are located. The foregoing ambient noise is mainly a sound of the sound source in a far field area of the first microphone array.

Figure 2B:
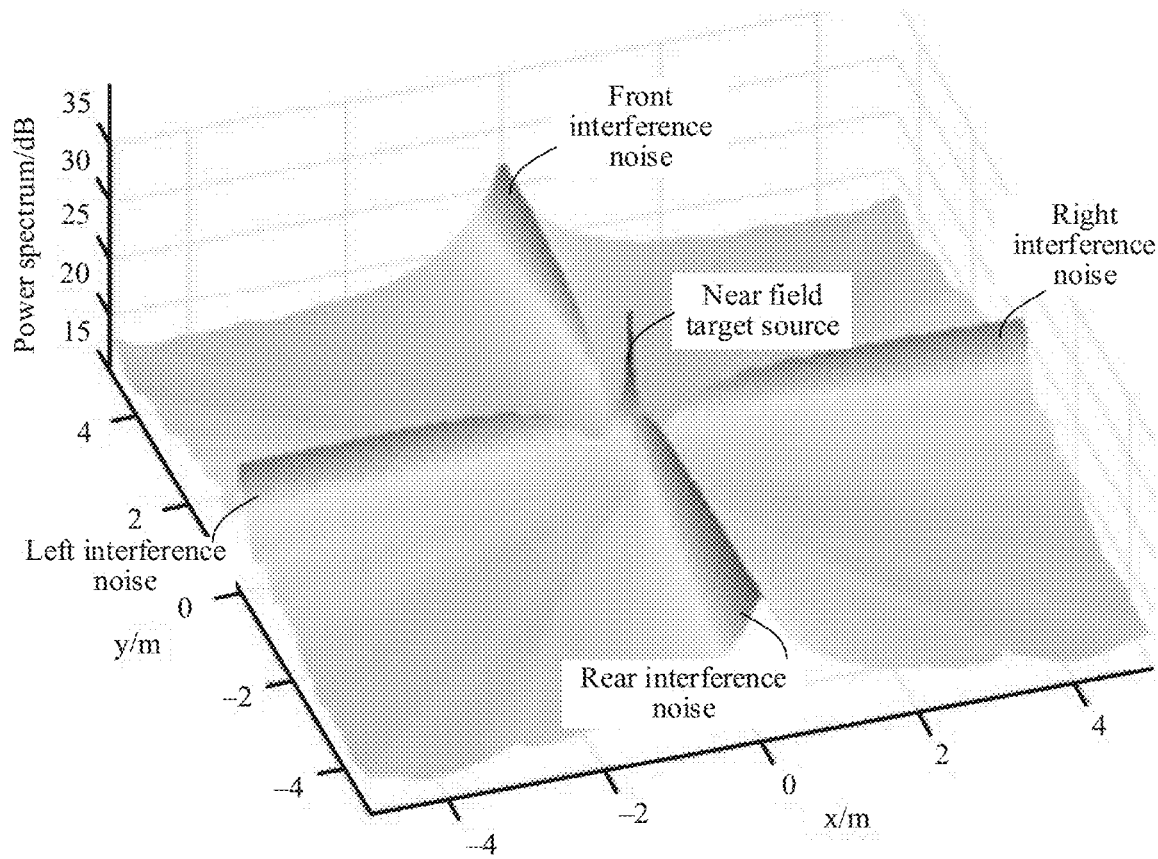
FIG. 2B is a schematic diagram of a spatial resolution capability of another microphone array according to an embodiment of this application.

FIG. 2B shows an example of a spatial resolution capability of the first microphone array. The near field area formed by the first microphone array combined with the microphone of the first electronic device 100 is larger than a near field area of a microphone array of a single TWS earphone, and is less affected by a user wearing posture. The first microphone array has a stronger spatial resolution capability. The first microphone array may more accurately distinguish a direction and a distance between each sound source and the first microphone array in a video recording process of the first electronic device. When a spatial energy spectrum of ambient noise from any direction of the far field area reaches the near field area, obvious attenuation occurs, and the first electronic device 100 can better distinguish the ambient noise sound from a target sound. The first electronic device may perform spatial filtering on an audio signal collected by the first microphone array, and suppress the ambient noise sound and enhance the target sound based on directions and distances of the target sound and the ambient noise. This reduces impact of the ambient noise on a video recorded by the first electronic device, and improves sound quality in the recorded video.

The schematic diagram of the spatial resolution capability shown in FIG. 2B is merely used to explain this application, and should not constitute a limitation on the spatial resolution capability of the first microphone array.

In some embodiments, there may be one or more microphones of the first electronic device 100 to form the first microphone array. There may also be one or more microphones of the left-ear and right-ear TWS earphones to form the first microphone array. That is, the first microphone array includes at least three microphones. The three microphones are respectively from the first electronic device 100, a left-ear TWS earphone 201, and a right-ear TWS earphone 202.

In addition, a headset is not limited to a TWS headset, and may be another type of headset, for example, a head mounted headset. When the headset establishes a communication connection to the first electronic device 100, and the first electronic device records a video, the microphone of the first electronic device 100 and the microphones of the headset may form the first microphone array to collect a sound.

The first electronic device 100 may be an electronic device with a camera, such as a mobile phone, a tablet computer, a notebook computer, a television, an ultra-mobile personal computer (ultra-mobile personal computer, UMPC), a handheld computer, a netbook, or a personal digital assistant (personal digital assistant, PDA). A specific type of the first electronic device 100 is not limited in this embodiment of this application.

In subsequent embodiments of this application, a microphone array including one microphone in the first electronic device 100, one microphone in the left-ear TWS earphone 201, and one microphone in the right-ear TWS earphone 202 is specifically used as an example to describe the sound collecting method provided in this application.

The following describes a near field area and a far field area of a microphone array mentioned in embodiments of this application.

Based on a distance between a sound source and the microphone array, a sound field model can be classified into a near field model and a far field model. A sound field model in the near field area of the microphone array is the near field model. In the near field model, a response of the microphone array is related to a direction of an incident sound source, and is related to a distance of the incident sound source. A sound wave is a spherical wave. A sound field model in the far field area of the microphone array is the far field model. In the far field model, a response of the microphone array is only related to a direction of an incident sound source, and is not related to a distance of the incident sound source. A sound wave is a plane wave.

A size of the near field area of the microphone array is positively correlated with a size of the microphone array. There is no absolute standard for dividing the near field area and the far field area. In some embodiments, an area whose distance from a central reference point of the microphone array is greater than a wavelength of a sound signal is the far field area of the microphone array. Otherwise, an area whose distance from a central reference point of the microphone array is less than a wavelength of a sound signal is the far field area of the microphone array is the near field area of the microphone array. A manner of dividing the near field area and the far field area of the microphone array is not limited in this embodiment of this application.

In this embodiment of this application, a size of a first microphone array is large, so that a location of a sound source of a sound that needs to be enhanced (for example, a user voice) can be better included in a near field area of the first microphone array. When performing spatial filtering on an audio signal collected by the first microphone array, a first electronic device may better distinguish a sound source of a target sound from a sound source of ambient noise by using differences of directions and distances. The sound source of the target sound may be a sound source located in the near field area of the first microphone array. The sound source of the ambient noise may be a sound source located in a far field area of the first microphone array.

The sound collecting method of this application can be applied to a scenario in which the first electronic device 100 is connected to the TWS headset and a front camera is turned on for live broadcast, vlog shooting and other video recording. In this case, the target sound may include a user voice and a sound of playing a musical instrument by a user.

The following describes a sound collecting scenario in an embodiment of this application.

In some embodiments, the first electronic device 100 may detect a user operation of enabling a sound source enhancement function. In a video recording scenario such as live broadcast or vlog shooting, the first electronic device 100 may use the microphone of the first electronic device 100, the microphone of the left-ear TWS earphone 201, and the microphone of the right-ear TWS earphone 202 to form the first microphone array, to collect a sound. The first electronic device 100 may enhance a target sound from a user based on audio collected by the first microphone array, and suppress ambient noise in the target sound, to improve sound quality in a recorded video.

For example, FIG. 3A to FIG. 3G are schematic diagrams of a sound collecting scenario according to an embodiment of this application.

Figure 3A:
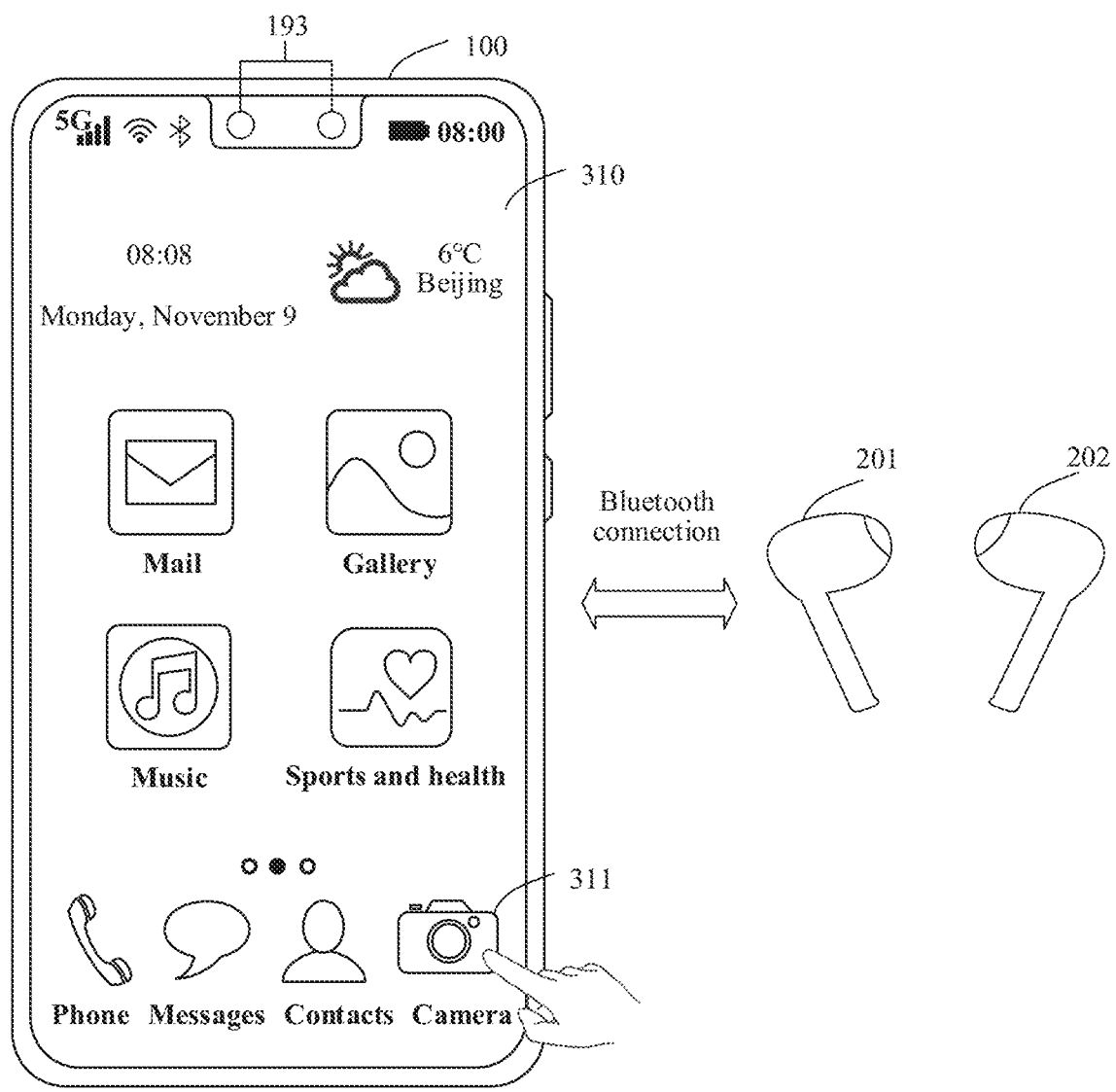
FIG. 3A to FIG. 3G are schematic diagrams of some sound collecting scenarios according to an embodiment of this application.

As shown in FIG. 3A, each of a left-ear TWS earphone 201 and a right-ear TWS earphone 202 establishes a Bluetooth connection to a first electronic device 100. In a case in which a TWS headset establishes a Bluetooth connection to the first electronic device 100, the first electronic device 100 may send through Bluetooth, audio to be played to the TWS headset. An audio output apparatus of the TWS headset, for example, a speaker, may play the received audio. The TWS headset may send, to the first electronic device 100 through Bluetooth, audio collected by using an audio input apparatus (for example, a microphone).

The first electronic device 100 may be provided with a camera 193. The camera 193 may include a front camera and a rear camera. The front camera of the first electronic device 100 may be shown in FIG. 3A. A quantity of cameras 193 of the first electronic device 100 is not limited in this embodiment of this application.

The first electronic device 100 may display a user interface 310 shown in FIG. 3A. The user interface 310 may include a camera application icon 311. In response to a user operation performed on the camera application icon 311, the first electronic device 100 may start a camera application.

Figure 3B:
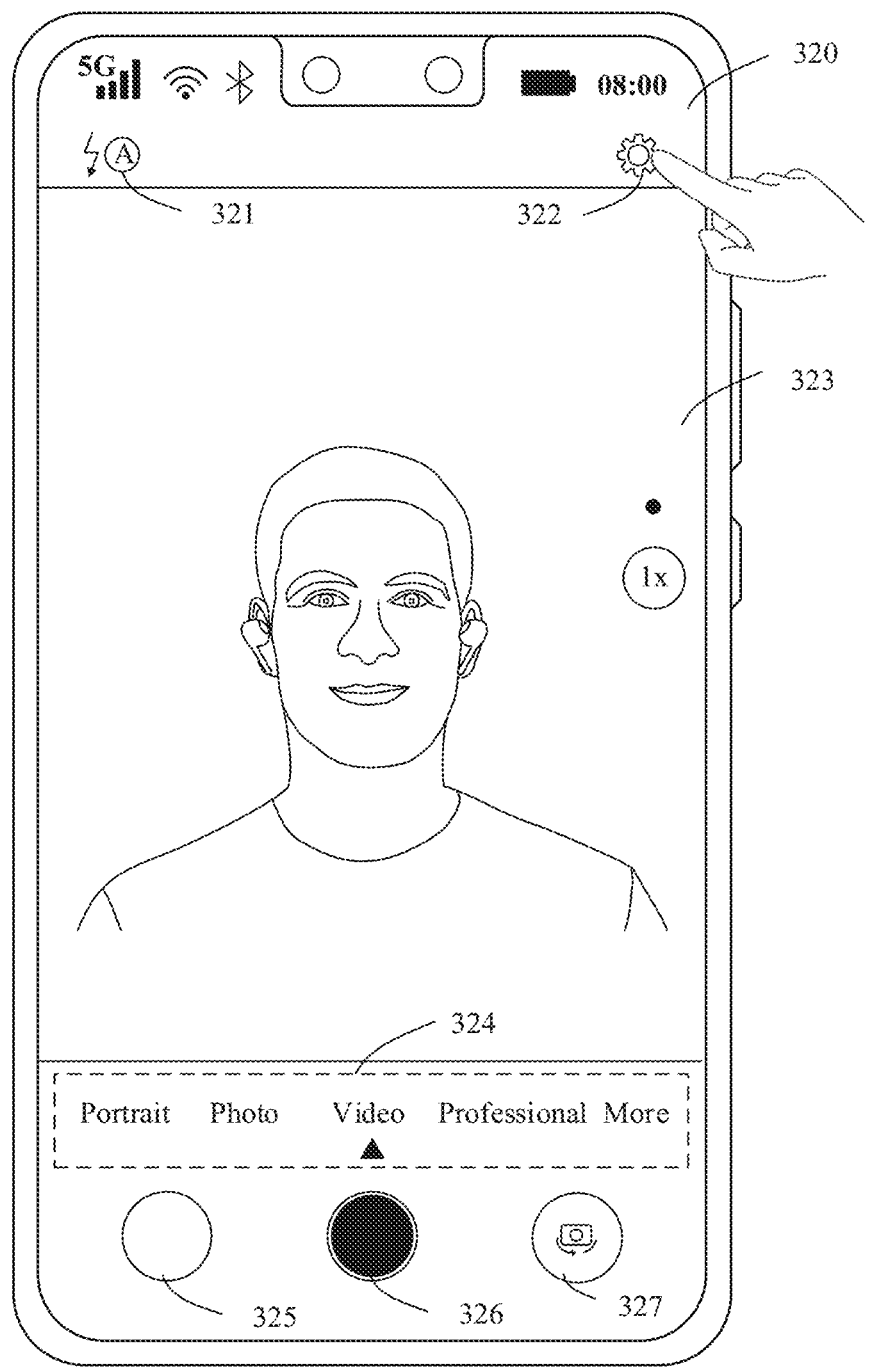

For example, the first electronic device 100 may turn on the front camera, and display a user interface 320 shown in FIG. 3B.

In response to a user operation performed on the camera application icon 311, the first electronic device 100 may further turn on the rear camera, or turn on the front camera and the rear camera. This is not limited in this embodiment of this application.

The user interface 310 may further include more content. This is not limited in this embodiment of this application.

As shown in FIG. 3B, the user interface 320 may include a flash control 321, a setting control 322, a preview box 323, a camera mode option 324, a gallery shortcut button 325, a video recording start control 326, and a camera flipping control 327.

The flash control 321 may be configured to turn on or off a flash.

The setting control 322 may be configured to: adjust a video recording parameter (for example, resolution), enable or disable some video recording manners (for example, mute shooting), and the like.

The preview box 323 may be configured to display an image collected by the camera 193 in real time. The first electronic device 100 may refresh display content in the first electronic device 100 in real time, so that a user previews an image currently collected by the camera 193.

One or more shooting mode options may be displayed in the camera mode option 324. The one or more shooting mode options may include a portrait mode option, a photographing mode option, a video recording mode option, a professional mode option, and a more option. The one or more shooting mode options may be represented as text information on an interface, for example, "portrait", "photographing", "video recording", "professional", or "more". This is not limited thereto. The one or more image shooting options may alternatively be represented as icons or interactive elements (interactive element, IE) in other forms on the interface. When detecting a user operation performed on the shooting mode option, the first electronic device 100 may enable a shooting mode selected by the user. In particular, when detecting a user operation performed on the more option, the first electronic device 100 may further display more other shooting mode options such as a slow-motion photographing mode option, and may present more photographing functions to the user. Not limited to that shown in FIG. 3B, more options may not be displayed in the camera mode options, and the user may browse other shooting mode options by sliding left/right in the camera mode option 324.

The gallery shortcut button 325 may be used to start a gallery application. In response to a user operation performed on the gallery shortcut button 325, for example, a tap operation, the first electronic device 100 may start the gallery application. In this way, the user can conveniently view a photographed photo and video without exiting the camera application and then starting the gallery application. The gallery application is an image management application on an electronic device such as a smartphone or a tablet computer, and may also be referred to as "Album". A name of the application is not limited in this embodiment. The gallery application may support the user in performing various operations on a picture stored on the first electronic device 100, for example, browsing, editing, deleting, and selecting.

The video recording start control 326 may be used to listen to a user operation that triggers starting of recording. For example, as shown in FIG. 3B, the video recording mode option is in a selected state. In response to a user operation performed on the video recording start control 326, the first electronic device 100 may start video recording. The first electronic device 100 may save images collected by the camera 193 in a time period from starting video recording to ending video recording in a sequence of collection time as a video. Audio in the video may come from audio collected by an audio input apparatus (for example, a microphone) of the first electronic device 100 and/or audio collected by the audio input apparatus (for example, a microphone) of the TWS headset that establishes the Bluetooth connection to the first electronic device 100.

The camera flipping control 327 may be used to listen to a user operation that triggers camera flipping. In response to a user operation performed on the camera flipping control 327, the first electronic device 100 may flip a camera. For example, the rear camera is switched to the front camera. In this case, the preview box 323 may display an image collected by the front camera shown in FIG. 3B.

The user interface 320 may further include more or less content. This is not limited in this embodiment of this application.

Figure 3C:
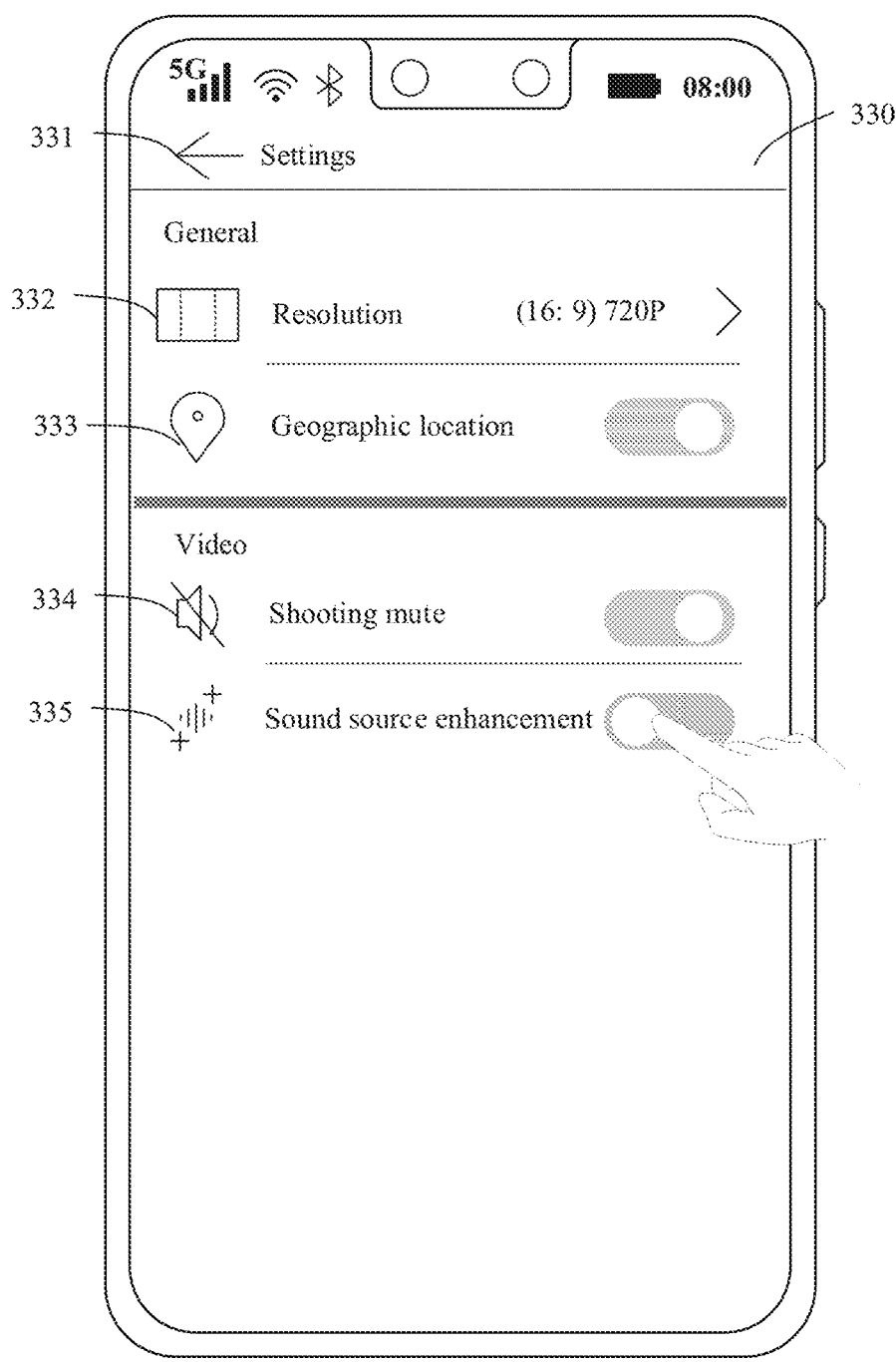
Figure 3D:
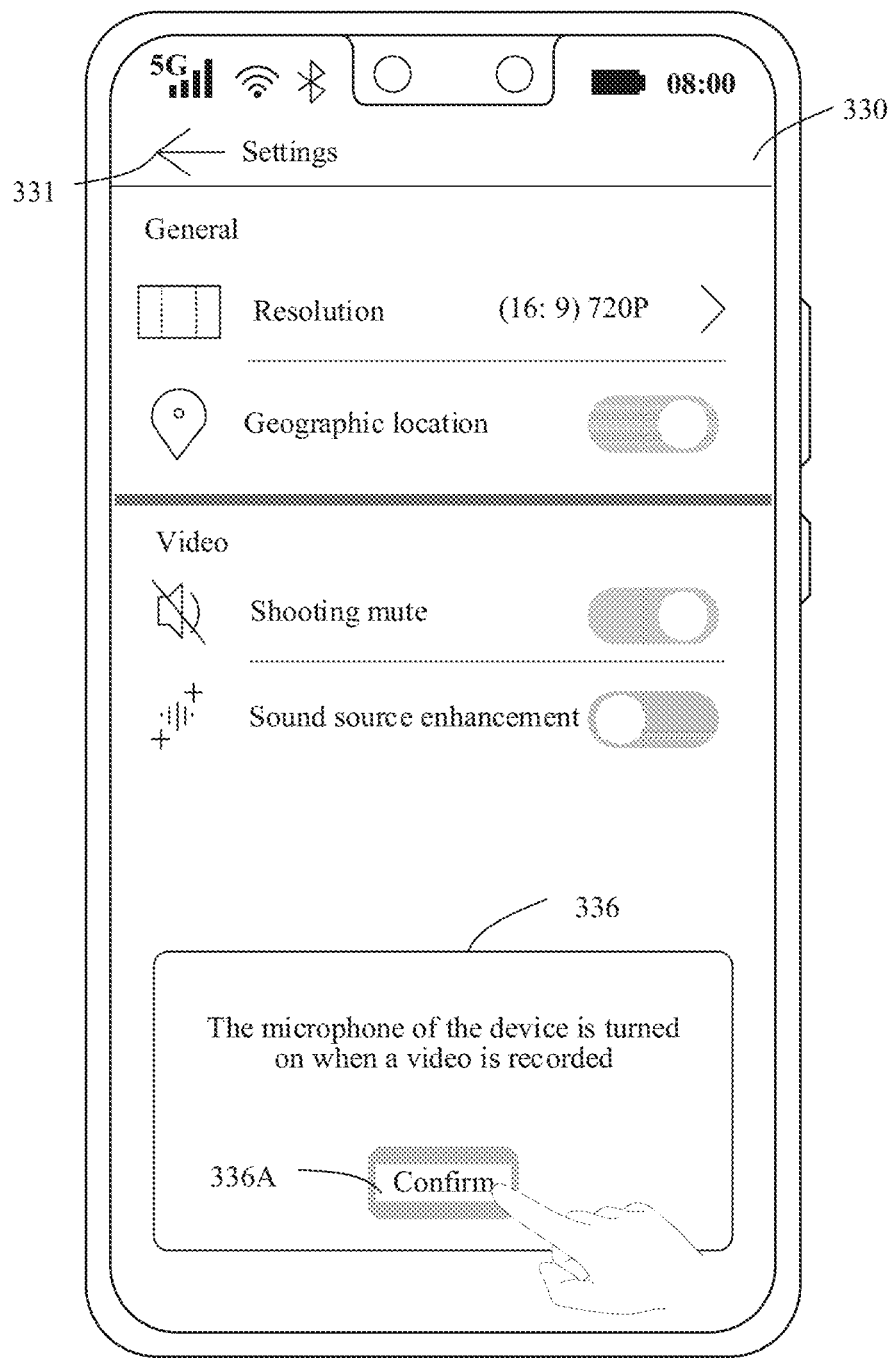

In response to a user operation performed on the setting control 322, the first electronic device 100 may display a user interface 330 shown in FIG. 3C. The user interface 330 may include a return control 331, a resolution control 332, a geographical location control 333, a shooting mute control 334, and a sound source enhancement control 335. The sound source enhancement control 335 may be used by the user to enable or disable a sound source enhancement function. When the sound source enhancement function is enabled, the first electronic device 100 turns on the microphone of the device when recording a video.

As shown in FIG. 3C, the sound source enhancement function is in a disabled state. In response to the user operation performed on the sound source enhancement function, the first electronic device 100 may display a user interface 330 shown in FIG. 3D. The user interface 330 may include a prompt box 336. The prompt box 336 may include a text prompt "The microphone of the device is turned on when a video is recorded." The prompt box 336 may be used to prompt the user that when the sound source enhancement function is enabled, the first electronic device 100 turns on the microphone of the device in a video recording process. The prompt box 336 may further include a determining control 336A. In response to a user operation performed on the determining control 336A, the first electronic device 100 may display a user interface 330 shown in FIG. 3E. In this case, the sound source enhancement function is an enabled state.

It may be understood that if the first electronic device 100 is not connected to the TWS headset, the sound source enhancement function fails. That is, the user cannot use the foregoing sound source enhancement function to improve sound quality in the recorded video.

Figure 3E:
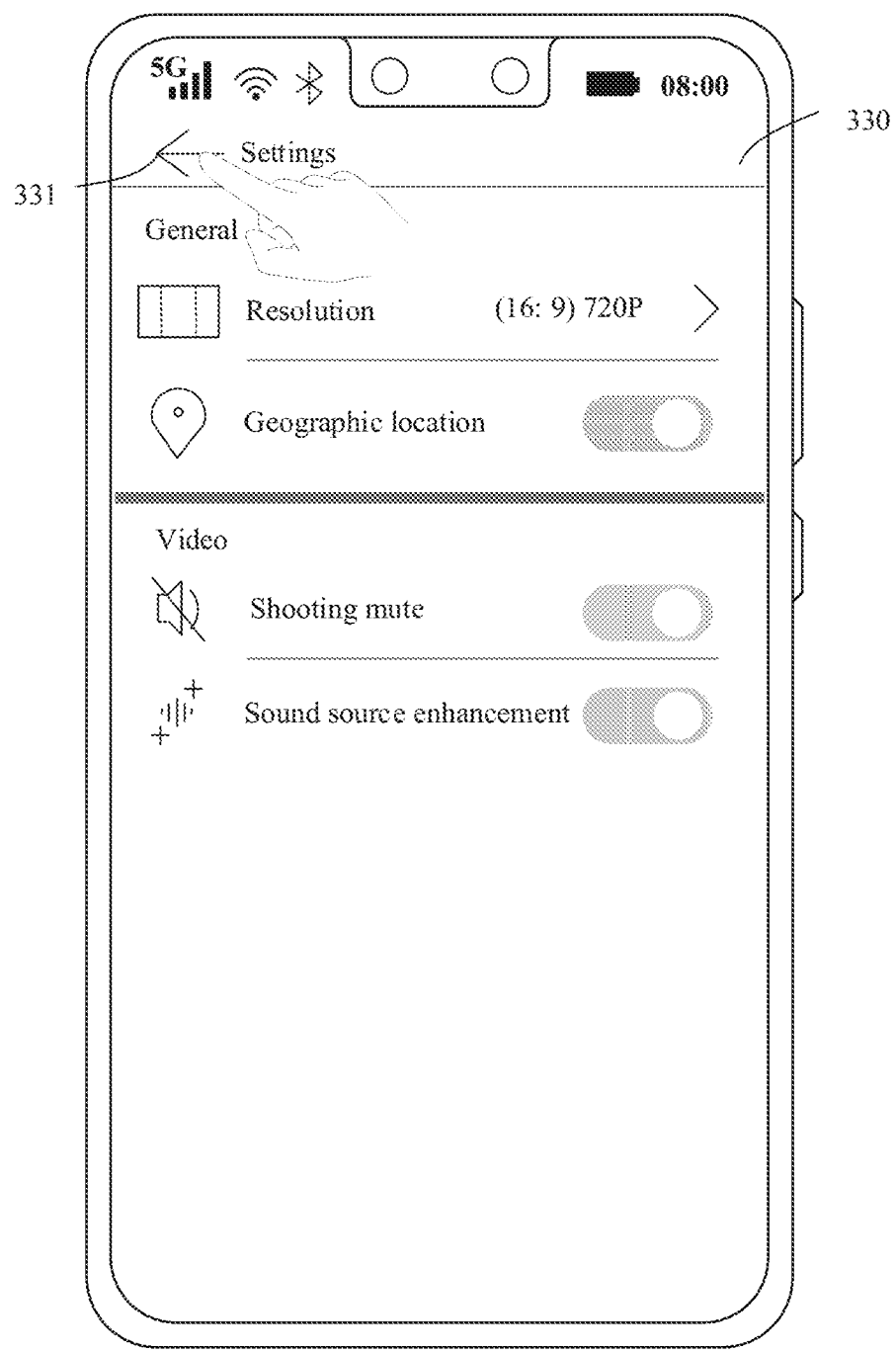
Figure 3F:
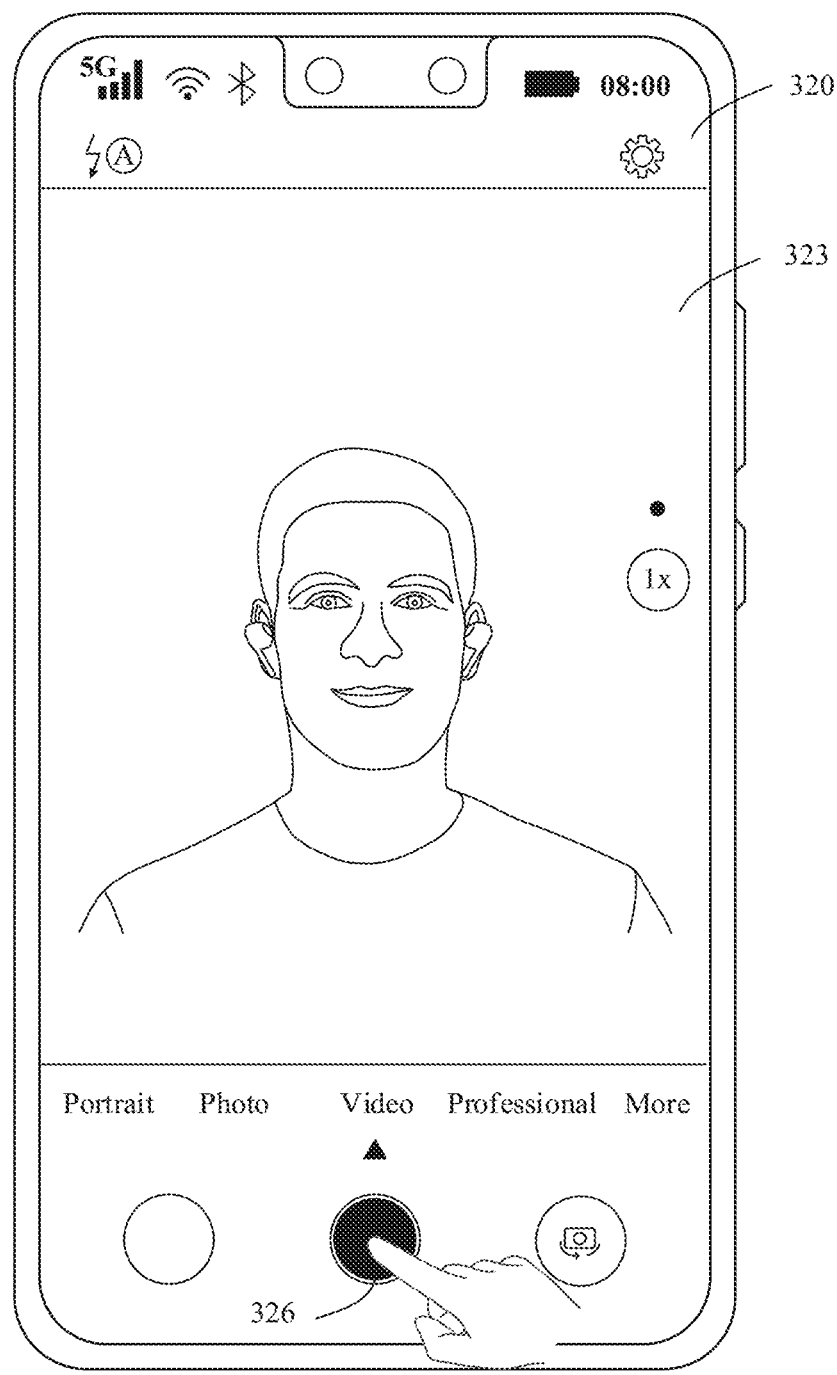

In response to a user operation performed on the return control 331 shown in FIG. 3E, the first electronic device 100 may display a user interface 320 shown in FIG. 3F. In response to a user operation performed on the video recording start control 326, the first electronic device 100 may start video recording.

Figure 3G:
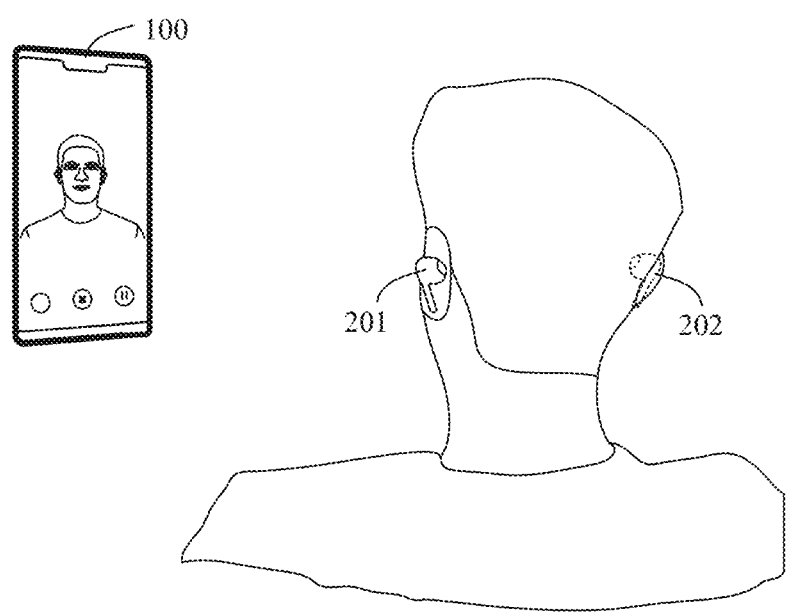

As shown in FIG. 3G, both the left-ear TWS earphone 201 and the right-ear TWS earphone 202 are connected to the first electronic device 100. The user wears the left-ear TWS earphone 201 and the right-ear TWS earphone 202, and performs video recording by using the front camera of the first electronic device 100. An audio signal in the video comes from a first audio signal collected by the microphone of the first electronic device 100, a second audio signal collected by a microphone of the left-ear TWS earphone 201, and a third audio signal collected by a microphone of the right-ear TWS earphone 202. The first electronic device 100 may process the first audio signal, the second audio signal, and the third audio signal, to enhance a target sound in the first audio signal, the second audio signal, and the third audio signal, and suppress ambient noise in the first audio signal, to improve sound quality in the recorded video.

In some embodiments, when the TWS headset establishes a connection to the first electronic device 100, and when the first electronic device 100 detects a user operation of starting video recording, the first electronic device 100 may directly turn on the microphone to collect a sound. That is, when wearing the TWS headset and using the first electronic device 100 to record a video, the user may not need to manually enable the sound source enhancement function. When the user wears the TWS headset and uses the first electronic device 100 to record a video, the first electronic device 100 may automatically implement the sound source enhancement function, to provide sound quality in the recorded video.

It should be noted that, in a process in which the first electronic device 100 processes the first audio signal, the second audio signal, and the third audio signal, because a specific time is required for transmitting the second audio signal and the third audio signal to the first electronic device 100, time delays of different time lengths exist between the first audio signal, the second audio signal, and the third audio signal. The first electronic device 100 may perform delay alignment on the first audio signal, the second audio signal, and the third audio signal, to obtain a joint microphone array signal.

In addition, to enhance a target sound in the joint microphone array signal and suppress ambient noise sound in the joint microphone array signal, the first electronic device may perform spatial filtering on the joint microphone array signal. The foregoing spatial filtering requires location information of a first microphone array formed by the microphone of the first electronic device 100, the microphone of the left-ear TWS earphone 201, and the microphone of the right-ear TWS earphone 202. Because the left-ear TWS earphone 201 and the right-ear TWS earphone 202 are respectively worn on a left ear and a right ear of the user, the first electronic device 100 may determine the location information of each microphone in the first microphone array by using a face image collected by the front camera and posture information of the first electronic device 100.

The foregoing implementation method for the first electronic device to perform delay alignment, determine location information of each microphone in the first microphone array, and perform spatial filtering on the joint microphone array signal is specifically described in subsequent embodiments.

User operations mentioned above and in subsequent embodiments are not limited in this embodiment of this application. For example, the user may indicate, by touching a location of a control on a display, the first electronic device 100 to execute an instruction corresponding to the control (for example, enabling the sound source enhancement function or starting video recording).

With reference to the sound collecting scenario in the foregoing embodiment, the following describes a first microphone array and a sound collecting system that are provided in embodiments of this application and that are used for sound collecting.

Figure 4:
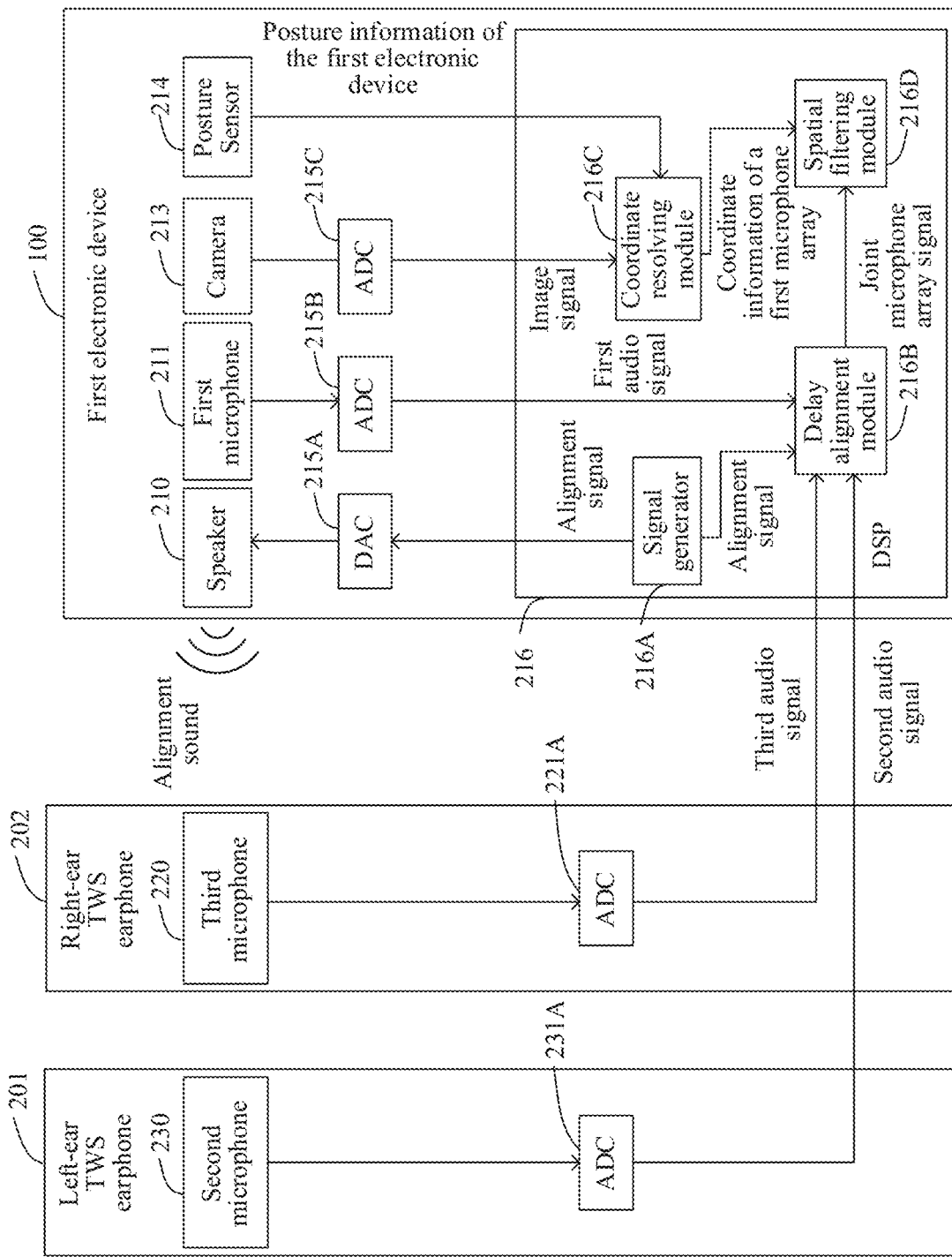
FIG. 4 is a schematic diagram of a structure of a sound collecting system according to an embodiment of this application.

As shown in FIG. 4, the sound collecting system may include a first electronic device 100, a left-ear TWS earphone 201, and a right-ear TWS earphone 202. The first microphone array may include a first microphone 211, a second microphone 230, and a third microphone 220. The first microphone 211 is a microphone of the first electronic device 100. The second microphone 230 is a microphone of the left-ear TWS earphone 201. The third microphone 220 is a microphone of the right-ear TWS earphone 202.

The first electronic device 100 may further include a speaker 210, a camera 213, a posture sensor 214, a digital-to-analog converter (digital to analog converter, DAC) 215A, an analog to digital converter (analog to digital converter, ADC) 215B, an ADC 215C, and a digital signal processor (digital signal processor, DSP) 216.

The speaker 210 may be configured to convert an audio electrical signal into a sound signal. The first electronic device 100 may play a sound by using the speaker 210.

The camera 213 may be the front camera in the camera 193 in the foregoing embodiment. The camera 213 may be configured to capture a static image or a video.

The posture sensor 214 may be configured to measure posture information of the first electronic device 100. The posture sensor 214 may include a gyroscope sensor and an acceleration sensor.

The DAC 215A may be configured to convert a digital audio signal into an analog audio signal.

The ADC 215B may be configured to convert an analog audio signal into a digital audio signal.

The ADC 215C may be configured to convert an analog image signal into a digital image signal.

The DSP 216 may be configured to process a digital signal, for example, a digital image signal and a digital audio signal. The DSP 216 may include a signal generator 216A, a delay alignment module 216B, a coordinate resolving module 216C, and a spatial filtering module 216D.

The signal generator 216A may be configured to generate an alignment signal. The alignment signal is a digital audio signal. Because a frequency band of an audio signal that can be heard by a human ear is generally 20 Hz (Hz) to 20000 Hz, the foregoing alignment signal may be an audio signal whose frequency is in a frequency band range greater than 20000 Hz. In this way, the alignment signal can avoid a frequency band that can be heard by a human ear, and avoid interference to a user. The alignment signal may be used by the first electronic device 100 to perform delay alignment on an audio signal collected by the microphone in the first microphone array. When the first electronic device 100 detects a user operation of starting video recording, the signal generator 216A may generate the alignment signal, and send the alignment signal to the DAC 215A.

In this embodiment of this application, a frequency of the foregoing alignment signal is not limited, and the alignment signal may alternatively be an audio signal whose frequency is 20000 Hz or a frequency within a frequency band range below 20000 Hz.

The DAC 215A may convert the alignment signal into an analog signal, and send the analog signal to the speaker 210. The speaker 210 may then emit an alignment sound. The alignment sound is a sound corresponding to the foregoing alignment signal. The first microphone 211, the second microphone 230, and the third microphone 220 all can hear the alignment sound.

In addition, the signal generator 216A may further send the alignment signal to the delay alignment module 216B.

The delay alignment module 216B may use the alignment signal to perform delay alignment on a first audio signal collected by the first microphone 211, a second audio signal collected by the second microphone 230, and a third audio signal collected by the third microphone 220, to obtain a joint microphone array signal. The joint microphone array signal is a matrix. A first row, a second row and a third row of the matrix may be respectively the first audio signal, the second audio signal, and the third audio signal that have undergone delay alignment processing.

The coordinate resolving module 216C may be configured to determine coordinates of each microphone in the first microphone array in a world coordinate system. The microphones in the first microphone array are located in different electronic devices. A location of each microphone in the first microphone array varies based on a distance and a posture of a user wearing a TWS headset relative to the first electronic device 100.

The coordinate resolving module 216C may resolve the coordinates of each microphone in the first microphone array in the world coordinate system by using a face image collected by the front camera (that is, the camera 213) and the posture information of the first electronic device 100. The camera 213 may send the collected image to the ADC 215C. The ADC 2150 may convert the image into a digital signal, to obtain an image signal shown in FIG. 4. The ADC 215C may send the image signal to the coordinate resolving module 216C. In addition, the posture sensor 214C may send the collected posture information of the first electronic device 100 to the coordinate resolving module 216C. The coordinate resolving module 216C may obtain coordinate information of the first microphone array based on the image signal and the posture information of the first electronic device 100. The coordinate information of the first microphone array includes coordinates of each microphone in the first microphone array in the world coordinate system.

The spatial filtering module 216D may be configured to perform spatial filtering on the joint microphone array signal. Based on the coordinate information of the first microphone array, the spatial filtering module 216D may enhance a target sound from the user in the joint microphone array signal, and suppress ambient noise. The spatial filtering module 216D may output a result audio signal. The result audio signal is the joint microphone array signal on which spatial filtering is performed.

In a possible implementation, the spatial filtering module 216D may perform spatial filtering on the first audio signal, the second audio signal, and the third audio signal together after delay processing. Specifically, the spatial filtering module 216D may use a plurality of rows of data in a same column in the joint microphone array as one group of data, and perform spatial filtering on each group of data. Further, the spatial filtering module may output a signal on which spatial filtering is performed. The signal is the result audio signal.

In another possible implementation, the spatial filter 216D may perform spatial filtering on the first audio signal, the second audio signal, and the third audio signal separately after delay alignment processing. Specifically, the spatial filter 216D may perform spatial filtering on the first row (that is, the first audio signal on which delay alignment processing is performed) in the joint microphone array, to obtain a first channel of audio. The spatial filter 216D may perform spatial filtering on the second row (that is, the second audio signal on which delay alignment processing is performed) in the joint microphone array, to obtain a second channel of audio. The spatial filter 216D may perform spatial filtering on the third row (that is, the third audio signal on which delay alignment processing is performed) in the joint microphone array, to obtain a third channel of audio. The first electronic device 100 may combine the first channel of audio, the second channel of audio, and the third channel of audio into one channel of audio, to obtain the result audio signal.

The first electronic device 100 may mix the result audio signal and a video collected by the camera, and then store the mixed result audio signal and the video locally or upload the mixed result audio signal and the video to a cloud server.

The left-ear TWS earphone 201 may further include an ADC 231A. The ADC 231A may be configured to convert an analog audio signal into a digital audio signal. For example, the second microphone 230 may send a heard sound (that is, the analog audio signal) to the ADC 231A. The ADC 231A may convert the sound into the second audio signal (that is, the digital audio signal).

The sound heard by the second microphone 230 may include the alignment sound, the target sound from the user (for example, a user voice, or a sound of playing a musical instrument by the user), the ambient noise, and the like. The second audio signal may include the alignment signal, a target sound signal from the user, and an ambient noise signal. The left-ear TWS earphone 201 may send the second audio signal to the first electronic device 100 through Bluetooth.

The right-ear TWS earphone 202 may further include an ADC 221A. The ADC 221A may be configured to convert an analog audio signal into a digital audio signal. For example, the third microphone 220 may send a heard sound (that is, an analog audio signal) to the ADC 221A. The ADC 221A may convert the foregoing sound into a third audio signal (that is, the digital audio signal). The sound heard by the third microphone 220 may include the alignment sound, the target sound from the user (for example, a user voice or a sound of playing a musical instrument by the user), the ambient noise, and the like. The third audio signal may include the alignment signal, the target sound signal from the user, and the ambient noise signal. The right-ear TWS earphone 202 may send the third audio signal to the first electronic device 100 through Bluetooth.

It can be learned from a location of each microphone in the first microphone array that a near field area formed by the first microphone array includes an area in which a user wearing a TWS headset and the first electronic device 100 are located. Compared with a microphone array in a single TWS earphone, the first microphone array has a larger size and a stronger spatial resolution capability; and can more accurately distinguish the target sound from the user in the near field area and the ambient noise from a far field area. In this way, the first electronic device 100 can better enhance the target sound and suppress the ambient noise when performing spatial filtering on the audio signal collected by the first microphone array, to improve sound quality in a recorded video.

In addition, adding the microphone in the first electronic device 100 to the microphone array can reduce impact of a posture of wearing the TWS headset by the user on enhancing the target sound and reducing the ambient noise by the first electronic device 100.

The following specifically describes a method for performing delay alignment on an audio signal according to an embodiment of this application.

Microphones in a first microphone array are distributed on different electronic devices. A first electronic device 100 may process an audio signal collected by the first microphone array, and mix the processed audio signal with a video collected by a camera. An audio signal collected by a microphone in a TWS headset needs to be sent to the first electronic device 100 through Bluetooth. The foregoing signal transmission introduces a delay difference of an order of hundreds of milliseconds. In addition, time points at which microphones in the first microphone array start to collect sound may be different, and time points at which the first electronic device 100 and the TWS headset process audio signals collected by respective microphones may also be different. The foregoing factors each cause a delay difference between a first audio signal, a second audio signal, and a third audio signal received by the first electronic device 100.

To resolve the foregoing delay difference problem, the first electronic device 100 may generate an alignment signal, and after converting the alignment signal into an analog audio sound effect, a speaker emits the alignment sound. The first electronic device may determine, by using the alignment signal, delay lengths between audio signals collected by the microphones.

In some embodiments, when a user operation of starting video recording is detected, the first electronic device 100 may emit the alignment sound. A first microphone, a second microphone, and a third microphone may respectively collect the first audio signal, the second audio signal, and the third audio signal. The first audio signal, the second audio signal, and the third audio signal each may include the alignment signal, a target sound signal from a user, and an ambient noise signal.

Figure 5A:
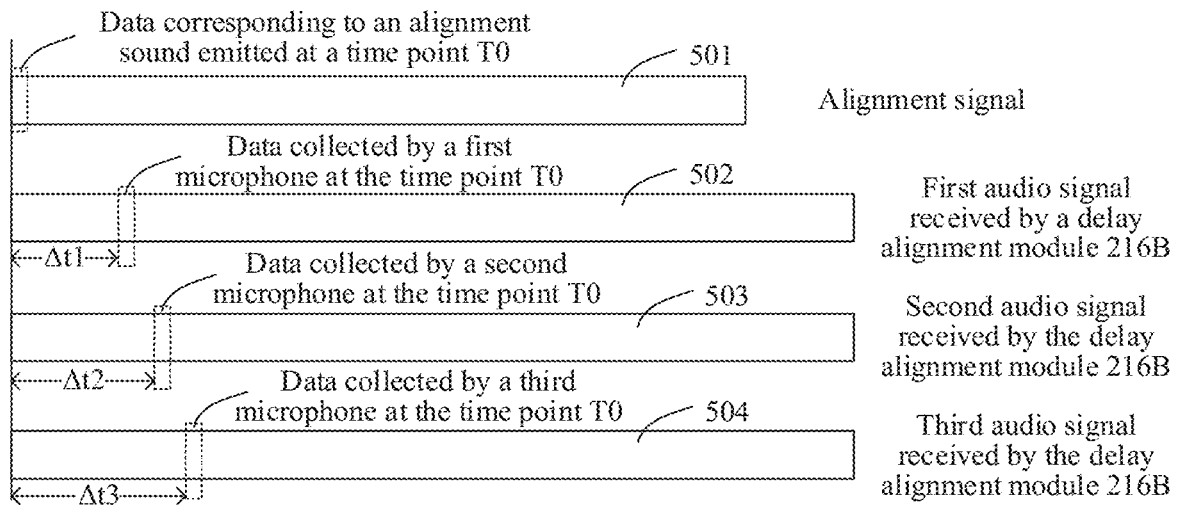
FIG. 5A and FIG. 5B are schematic diagrams of a method for performing delay alignment on an audio signal according to an embodiment of this application.

As shown in FIG. 5A, a delay alignment module 216B of a first electronic device 100 may receive a first audio signal 502, a second audio signal 503, a third audio signal 504, and an alignment signal 501 from a signal generator 216A, Data that is in the alignment signal 501 and that corresponds to an alignment sound emitted at a time point T0, data that is in the first audio signal 502 and that is collected by a first microphone at the time point T0, data that is in the second audio signal 503 and that is collected by a second microphone at the time point T0, and data that is in the third audio signal 504 and that is collected by a third microphone at the time point T0 are not aligned.

To determine data that is collected at a same time point in the first audio signal 501, the second audio signal 502, and the third audio signal 503, the delay alignment module 216B may perform delay alignment on the first audio signal 502, the second audio signal 503, and the third audio signal 504 with the alignment signal 501.

Specifically, the delay alignment module 216B may perform high-pass filtering on the first audio signal 501, the second audio signal 502, and the third audio signal 503, to obtain alignment signals in these audio signals. The delay alignment module 216B may perform delay correlation detection on the alignment signals in the audio signals and the alignment signal 501, to obtain delay lengths between the alignment signals. The delay lengths between the alignment signals are the delay lengths between the first audio signal 502, the second audio signal 503, the third audio signal 504, and the alignment signal 501.

The delay alignment module 216B may perform delay processing of different time lengths on the alignment signals in the first audio signal 501, the second audio signal 502, and the third audio signal 503. Then, the delay alignment module 216B may compare correlation between the alignment signals that undergoes delay processing and the alignment signal 501.

Figure 5B:
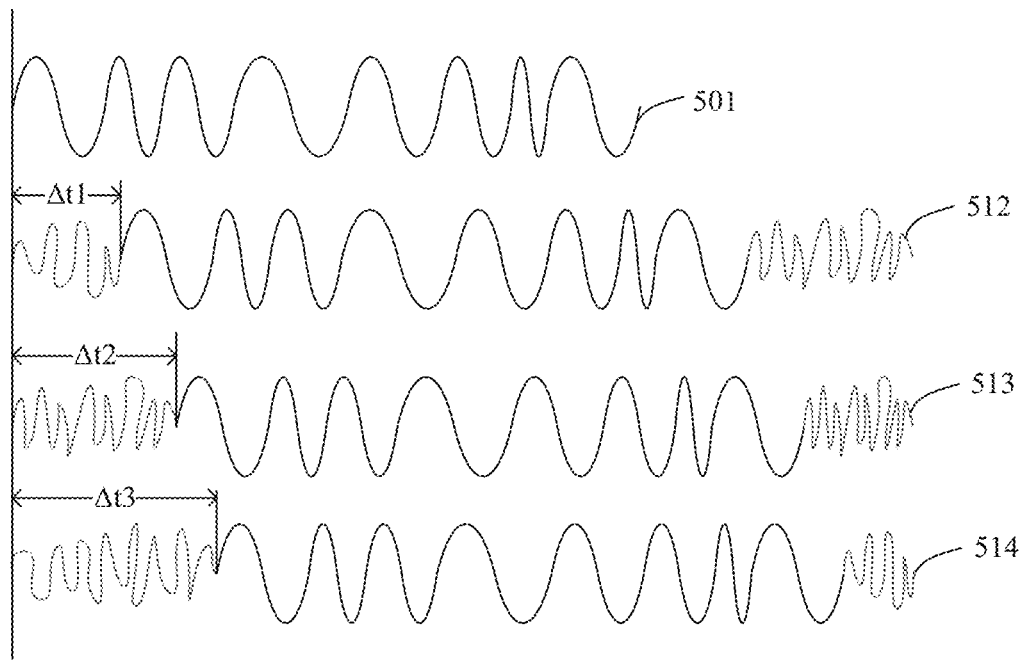

As shown in FIG. 5B, the delay alignment module 216B may perform high-pass filtering on the first audio signal 502, to obtain a signal 512 including the alignment signal. The delay alignment module 216B may compare a correlation between the alignment signal 501 and the signal 512 starting at a different time point. The alignment signal 501 may be, for example, an audio signal with a time length of one second. The delay alignment module 216B may determine that a correlation between the alignment signal 501 and a part of the signal 512 starting, from a time point $\Delta t1$ and with a time length of one second is highest. In this case, the delay alignment module may determine that a delay length between the first audio signal 502 and the alignment signal 501 is $\Delta t1$.

The delay alignment module 216B may perform high-pass filtering on the second audio signal 503, to obtain a signal 513 including the alignment signal. The delay alignment module 216B may compare a correlation between the alignment signal 501 and the signal 513 starting at a different time point. The alignment signal 501 may be, for example, an audio signal with a time length of one second. The delay alignment module 216B may determine that a correlation between the alignment signal 501 and a part of the signal 513 starting from a time point $\Delta t2$ and with a time length of one second is highest. In this case, the delay alignment module may determine that a delay length between the second audio signal 503 and the alignment signal 501 is $\Delta t2$.

The delay alignment module 216B may perform high-pass filtering on the third audio signal 504, to obtain a signal 514 including the alignment signal. The delay alignment module 216B may compare a correlation between the alignment signal 501 and the signal 514 starting at a different time point. The alignment signal 501 may be, for example, an audio signal with a time length of one second. The delay alignment module 216B may determine that a correlation between the alignment signal 501 and a part of the signal 514 starting from a time point $\Delta t3$ and with a time length of one second is highest. In this case, the delay alignment module may determine that a delay length between the third audio signal 504 and the alignment signal 501 is $\Delta t3$.

A time length of the alignment signal 501 is not limited in this embodiment of this application. The alignment signal 501 may be an entire alignment signal generated by the signal generator 216A. Optionally, the alignment signal 501 may be a part of the entire alignment signal generated by the signal generator 216B. For example, the alignment signal generated by the signal generator 216B is a periodic signal. The signal generator 216B may generate alignment signals of a plurality of periods. The delay alignment module 216B may perform delay correlation detection on the signal 512, the signal 513, and the signal 514 by using an alignment signal of one period, to determine delay lengths between the first audio signal, the second audio signal, and the third audio signal.

The foregoing delay correlation detection may be a correlation detection method such as a cross-correlation time estimation method. A method for performing delay correlation detection by the delay alignment module 216B is not limited in this embodiment of this application.

When the delay lengths are determined, the delay alignment module 216B may determine, by subtracting the delay length corresponding to an audio signal front a time point at which the audio signal is received, data that is collected at a same time point by the microphones belonging to the first microphone array and that is in the audio signals. The delay alignment module 216B may output a joint microphone array signal. The joint microphone array signal may include a plurality of audio signals. The plurality of audio signals are audio signals obtained after the alignment signals in the first audio signal 502, the second audio signal 503, and the third audio signal 504 are filtered out. In the plurality of audio signals included in the joint microphone array signal, data corresponding to a same time point is data collected by the microphones in the first microphone array at the same time point. In this way, the delay alignment module 216B may eliminate a delay difference caused by signal transmission.

Examples in FIG. 5A and FIG. 5B are merely used to explain this application and shall not constitute a limitation.

In some embodiments, the delay alignment module 216B may further use any one of the first audio signal 502, the second audio signal 503, and the third audio signal 504 as a reference audio signal, and perform delay alignment between another audio signal and the reference audio signal. For example, the delay alignment module 216B may use the first audio signal 502 as a reference audio signal. The delay alignment module 216B may perform high-pass filtering on the first audio signal 502, the second audio signal 503, and the third audio signal 504, to obtain alignment signal parts in the audio signals. The delay alignment module 216B may perform delay processing of different time lengths on the alignment signal parts in the second audio signal 503 and the third audio signal 504, to determine delay lengths at which a correlation between the alignment signal parts of the second audio signal 503 and the third audio signal 504 and the alignment signal part of the first audio signal 501 is the highest. In this way, the delay alignment module 216B may determine the delay lengths of the second audio signal 503 and the third audio signal 504 relative to the first audio signal 502.

In some embodiments, the first electronic device 100 may generate the alignment signal in a preset time period (for example, a preset time period before video recording starts or a preset time period after video recording starts) for starting video recording, and emit the alignment sound. The first electronic device 100 may determine the delay lengths between the first audio signal, the second audio signal, and the third audio signal based on the alignment signal of the preset time period. The delay lengths generally do not change or change very little in a video recording process of the first electronic device 100. In a video recording process after the preset time period, the first electronic device 100 may perform delay alignment on the first audio signal, the second audio signal, and the third audio signal based on the delay lengths. In addition, the first electronic device 100 may stop generating the alignment signal, to save power consumption of the first electronic device 100.

The following specifically describes a method for determining coordinate information of a first microphone array according to an embodiment of this application.

A first electronic device 100 may perform spatial filtering on the foregoing joint microphone array signal, to enhance a target sound from a user and suppress ambient noise. In the foregoing spatial filtering process, the first electronic device 100 needs to determine a direction of a target sound signal and a direction of the ambient noise by determining the coordinate information of the first microphone array.

Microphones in the first microphone array are separately distributed in a TWS headset and the first electronic device 100. The foregoing TWS headset is usually worn on a left ear and a right ear of the user. The first electronic device 100 may determine location information of the first microphone array by using a face image collected by a front camera and posture information of the first electronic device 100.

1. The first electronic device 100 may determine coordinates of each microphone in the first microphone array in a first electronic device coordinate system.

The first electronic device 100 may first determine a conversion relationship between a three-dimensional (3 dimensions, 3D) head coordinate system and the first electronic device coordinate system based on a face image. Then, the first electronic device 100 may determine coordinates of the microphone of the TWS headset in the first microphone array in the first electronic device coordinate system by converting coordinates of outer auricles of a left ear and a right ear of a user in the 3D head coordinate system into coordinates in the first electronic device coordinate system.

Figure 6A:
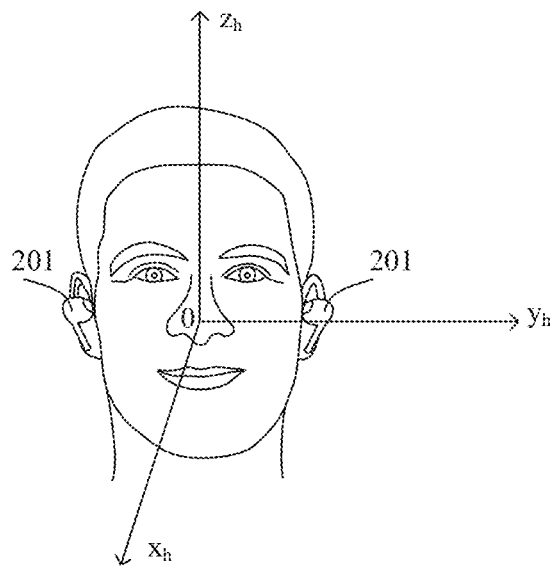
FIG. 6A to FIG. 6C are some schematic diagrams of coordinate conversion according to an embodiment of this application.

The 3D head coordinate system may be determined based on a standard head model. Each key point on a face may correspond to determined coordinates in the 3D head coordinate system. As shown in FIG. 6A, a 3D head coordinate system $x_h\text{-}y_h\text{-}z_h$ may be a three-dimensional coordinate system established by using a location of a nose tip in a standard head as an origin, using a direction perpendicular to a face as a direction of an x-axis, using a horizontal direction parallel to the face as a direction of a y-axis, and using a vertical direction parallel to the face as a direction of a z-axis. The first electronic device 100 may store related data of the 3D head coordinate system $x_h\text{-}y_h\text{-}z_h$. A method for establishing the 3D head coordinate system is not limited in this embodiment of this application.

The first electronic device 100 may determine an extrinsic parameter matrix based on a relationship between coordinates of a key point of a face image in a pixel coordinate system and coordinates of a corresponding key point in a 3D head coordinate system. The pixel coordinate system is a two-dimensional coordinate system, and may be used to reflect an arrangement status of pixels in an image. For example, the pixel coordinate system may be a two-dimensional coordinate system established by using any pixel of the image as an origin and using directions parallel to two sides of an image plane as directions of an x-axis and a y-axis. The extrinsic parameter matrix may be used to describe a conversion relationship between the 3D head coordinate system $x_h\text{-}y_h z_h$ and the first electronic device coordinate system $x_d\text{-}y_d\text{-}z_d$.

Specifically, the face image collected by the front camera of the first electronic device 100 may include N key points. The N key points are respectively $p_1, p_2, \ldots, p_i, \ldots, p_N$, where i is a positive integer less than or equal to N. The N key points may be any N key points in an area in which the face is located in the face image, for example, a key point in an area in which a forehead area is located, a key point in an area in which a cheek is located, and a key point in an area in which a lip is located. A quantity of the foregoing key points is not limited in this embodiment of this application.

The first electronic device 100 may determine coordinates $\{h_i=[x_i, y_i, z_i]^T, 2, \ldots N\}$ of the N key points in the 3D head coordinate system $x_h\text{-}y_h\text{-}z_h$. The first electronic device 100 may determine coordinates $\{g_i=[u_i, v_i]^T, i=1,2, \ldots, N\}$ of the N key points in the pixel coordinate system by using a key point detection algorithm. The key point detection algorithm may be, for example, a method for determining key point coordinates by using a trained neural network model. The key point detection algorithm is not limited in this embodiment of this application.

The coordinates of the N key points in the pixel coordinate system and the coordinates of the N key points in the 3D head coordinate system may have a relationship in the following formula (1):

$$g_i = C^*(R^*h_i + T) \qquad (1)$$

where

C is an intrinsic parameter matrix. The intrinsic parameter matrix may be used to describe a conversion relationship between the pixel coordinate system and the first electronic device coordinate system $x_d$-$y_d$-$z_d$. The intrinsic parameter matrix is related only to a parameter of a camera of the first electronic device 100. The intrinsic parameter matrix may be obtained by using a camera calibration method. For a specific implementation method for the camera calibration, refer to a camera calibration method in the conventional technology. Details are not described herein. The first electronic device 100 may store the intrinsic parameter matrix C. R is a rotation matrix. T is a center offset vector. The foregoing R and T jointly form an extrinsic parameter matrix [R|T].

The first electronic device 100 may resolve the extrinsic parameter matrix based on the coordinates of the N key points in the pixel coordinate system and the coordinates of the N key points in the 3D head coordinate system.

$$R(\alpha, \beta, \gamma) = \begin{bmatrix} 1 & 0 & 0 \\ 0 & \cos\alpha & \sin\alpha \\ 0 & -\sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix} \quad (2)$$

$$T = \begin{bmatrix} x \\ y \\ z \end{bmatrix} \quad (3)$$

Figure 6B:
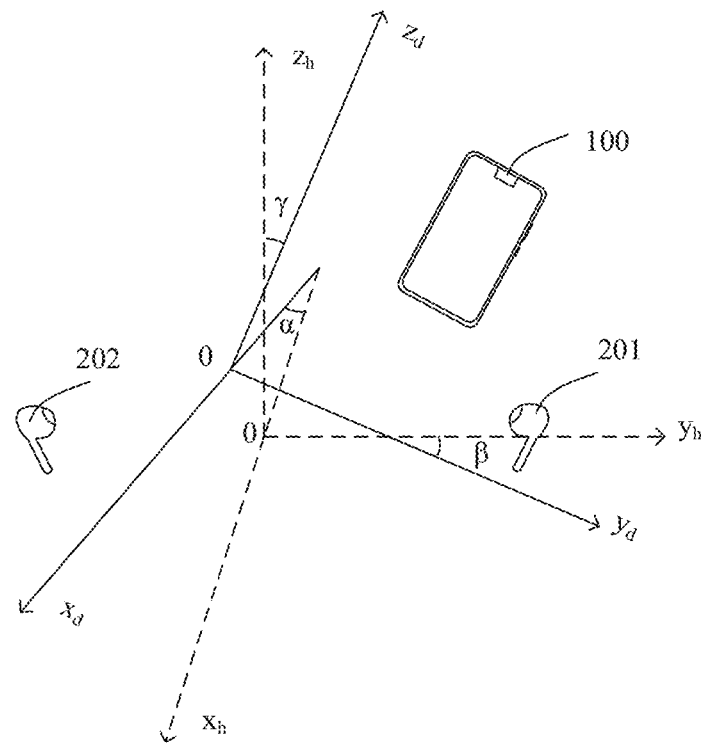

As shown in FIG. 6B, $\alpha$, $\beta$, $\gamma$ may be deflection angles between coordinate axes of the 3D head coordinate system $x_h$-$y_h$-$z_h$ and the first electronic device coordinate system $x_d$-$y_d$-$z_d$, and x, y, and z in the center offset vector T may be offsets on an $x_d$ axis, a $y_d$ axis, and a $z_d$ axis in the first electronic device coordinate system when the origin of the 3D head coordinate system is offset to an origin of the first electronic device coordinate system.

The first electronic device 100 may store the extrinsic parameter matrix.

Further, the first electronic device 100 may determine coordinates of key points at which the outer auricles of the left-ear and the right-ear are located in the 3D head coordinate system. The coordinates of the outer auricle of the left-ear in the 3D head coordinate system may be $h_L=[x_L, y_L, z_L]^T$. The coordinates of the outer auricle of the right-ear in the 3D head coordinate system may be $h_R=[x_R, y_R, z_R]^T$. The first electronic device 100 may use $h_L$ and $h_R$ as coordinates of a second microphone 230 of a left-ear TWS earphone 201 and a third microphone 220 of a right-ear TWS earphone 202 in the 3D head coordinate system respectively.

Because the extrinsic parameter matrix may be used to describe the conversion relationship between the 3D head coordinate system and the first electronic device coordinate system, the first electronic device 100 may convert the coordinates of the second microphone 230 and the third microphone 220 in the 3D head coordinate system into coordinates in the first electronic device coordinate system. The coordinates of the second microphone 230 in the first electronic device coordinate system may be $e_2=h_L*[R|T]$. The coordinates of the third microphone 220 in the first electronic device coordinate system may be $e_3=h_R*[R|T]$.

In addition, the first electronic device 100 may store coordinates $e_1$ of the first microphone 211 in the foregoing embodiment in the first electronic device coordinate system.

In this way, the first electronic device 100 may determine coordinates $E=\{e_1, e_2, e_3\}$ of each microphone in the first microphone array in the first electronic device coordinate system.

2: The first electronic device 100 may determine a conversion relationship between the first electronic device coordinate system and a world coordinate system, and resolve coordinates of each microphone in the first microphone array in the world coordinate system.

A placement posture of the first electronic device 100 is unknown and time-varying. The target sound that needs to be collected by the first microphone array includes the voice of the user, and may include the sound of playing a musical instrument by the user. In a spatial filtering process, using the coordinates of each microphone in the first microphone array in the first electronic device coordinate system by the first electronic device reduces an effect of spatial filtering. To better improve an effect of enhancing a target sound and reducing ambient noise, the first electronic device 100 may convert the coordinates of each microphone in the first microphone array in the first electronic device coordinate system into the coordinates in the world coordinate system.

Figure 6C:
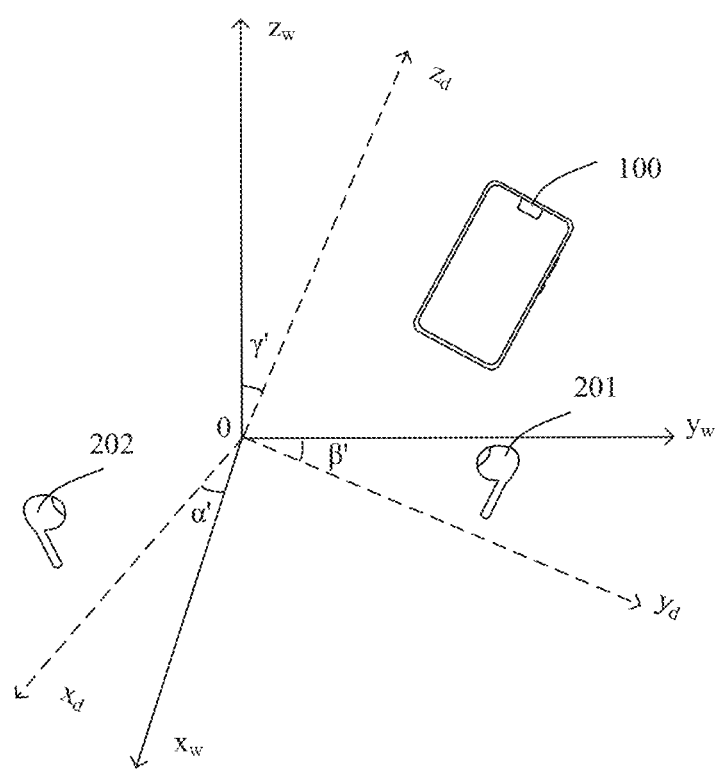

Specifically, the first electronic device 100 may obtain posture information of the first electronic device 100 by using a posture sensor 214. As shown in FIG. 6C, a posture signal may include deflection angles d, $\beta'$, and $\gamma'$ between coordinate axes of the first electronic device coordinate system $x_d$-$y_d$-$z_d$ and the world coordinate system $x_w$-$y_w$-$z_w$. The first electronic device 100 may determine coordinates $E'=\{e_1', e_2', e_3'\}$ of each microphone in the first microphone array in the world coordinate system by using the posture information, where E' and E may have a relationship shown in the following formula (4):

$$E' = \left\{ \begin{bmatrix} 1 & 0 & 0 \\ 0 & \cos\alpha' & \sin\alpha' \\ 0 & -\sin\alpha' & \cos\alpha' \end{bmatrix} \begin{bmatrix} \cos\gamma' & -\sin\gamma' & 0 \\ \sin\gamma' & \cos\gamma' & 0 \\ 0 & 0 & 1 \end{bmatrix} \right\}^{-1} E \quad (4)$$

In some embodiments, the process of determining the coordinate information of the first microphone array may be completed by the coordinate resolving module 216C shown in FIG. 4.

The following specifically describes a spatial filtering method according to an embodiment of this application.

When the joint microphone array signal and the coordinate information of the first microphone array are obtained, a first electronic device 100 may perform spatial filtering on the joint microphone array signal. The first electronic device 100 may first perform voice activity detection on the joint microphone array signal. The voice activity detection may be used to distinguish between a signal whose frequency point is on a target sound and a signal whose frequency point is on an ambient noise in the joint microphone array signal. Further, the first electronic device 100 may update a noise spatial characteristic based on the signal whose frequency point is on the ambient noise. The first electronic device 100 may estimate a target steering vector based on the signal whose frequency point is on the target sound. Both the noise spatial characteristic and the target steering vector are parameters used to determine a parameter of a spatial filter. The noise spatial characteristic update may be used to reduce impact of the target sound on suppressing ambient noise by the spatial filter. The target steering vector estimation may be used to reduce impact of the ambient noise at a same frequency point as the target sound on suppressing ambient noise by the spatial filter, thereby improving an effect of spatial filtering.

The following describes the foregoing methods for voice activity detection, noise spatial characteristic update, target steering vector estimation, and spatial filter determining.

1. Voice Activity Detection (Voice Activity Detection, VAD)

In some embodiments, a sound collected by a first microphone array in a near field area mainly includes a user voice and a sound of playing a musical instrument by a user. That is, the target sound signal that needs to be enhanced in the joint microphone array signal mainly includes a voice signal and a sound signal of a musical instrument. Based on a difference between a characteristic of a voice signal and a characteristic of a sound signal of a musical instrument and a characteristic of an ambient noise signal, a first electronic device 100 may perform voice activity detection on a joint microphone array signal by using a neural network model, to distinguish between a target sound signal whose frequency point is on a target sound and an ambient noise signal whose frequency point is on an ambient noise signal in the joint microphone array signal.

The foregoing neural network model for performing voice activity detection may be obtained by training by using the voice signal and the sound signal of a musical instrument. The trained neural network model may be used to distinguish between the target sound signal and the ambient noise signal in the joint microphone array signal. For example, if a voice signal or a sound signal of a musical instrument whose frequency point is on a voice or a musical instrument sound is input into a trained neural network model, the trained neural network model may output a label 1. The label 1 may indicate that an input received by the trained neural network model is the target sound signal whose frequency point is on the target sound. If an ambient noise signal whose frequency point is on the ambient noise is input into the trained neural network model, the trained neural network model may output a label 0. The label 1 may indicate that an input received by the trained neural network model is not the target sound signal (for example, is an ambient noise signal).

The first electronic device 100 may store the trained neural network model.

A method fir training the neural network model is not limited in this embodiment of this application. For a training method of the neural network model, refer to a specific implementation method in the conventional technology. Details are not described herein again. The neural network model may be a convolutional neural network model, a deep neural network model, or the like. A type of the neural network model is not limited in this embodiment of this application.

In some embodiments, the first electronic device 100 may use the joint microphone array signal and the coordinate information of the first microphone array as an input of the trained neural network model. In this way, the trained neural network model can adapt to impact of a change in the coordinate information of the first microphone array on voice activity detection. In a case in which the first microphone array has different structures, the trained neural network model can better distinguish between the target sound signal and the ambient noise signal in the joint microphone array signal.

2. Noise Spatial Characteristic Update

The first electronic device 100 may update a noise spatial characteristic of each frequency point in the joint microphone array signal by using a detection result of the voice activity detection, to reduce interference of the target sound signal to noise spatial characteristic of ambient noise.

In a possible implementation, the noise space characteristic may be expressed by using a noise covariance matrix.

The first electronic device 100 may update the noise covariance matrix based on the detection result of the voice activity detection. Specifically, a short-time Fourier transform (short time fourier transform, STFT) of the joint microphone array signal at a time point t and a frequency point f is $X_t(f)$. A noise covariance matrix at a previous time point of the time point t is $R_{t-1}(f)$. The first electronic device 100 performs voice activity detection on the joint microphone array signal. A detection result of the joint microphone array signal at the frequency point f is vad(f). The first electronic device 100 may update the noise covariance matrix at the time point t according to the following formula (5):

$$R_t(f) = \begin{cases} R_{t-1}(f) & vad(f) = 1 \\ (1-fac)*R_{t-1}(f) + fac*X_t(f)*X_t^H(f) & vad(f) = 0 \end{cases}, \quad (5)$$

where $R_t(f)$ is the noise covariance matrix at the time point t. fac is a smoothing factor. fac is greater than or equal to 0 and less than or equal to 1. fac A value of may be preset based on experience. A specific value of fac is not limited in this embodiment of this application. $X_t^H(f)$ is a conjugate transposition of $X_t(f)$. vad(f)=1 may indicate that an output label of the neural network model used for voice activity detection is 1. That is, a signal of the joint microphone array signal at the frequency point f is the target sound signal. vad(f)=0 may indicate that an output label of the neural network model used for voice activity detection is 0. That is, a signal of the joint microphone array signal at the frequency point f is an ambient noise signal.

It can be learned from the foregoing method for updating a noise spatial characteristic that the first electronic device 100 may smoothly update a noise control characteristic based on whether the joint microphone array signal of the frequency point f is the target sound signal or the ambient noise sound signal. This can reduce a sudden change of ambient noise and impact of the target sound on suppressing ambient noise by the spatial filter.

In addition to the foregoing method for updating the noise spatial characteristic, the first electronic device 100 may further update the noise spatial characteristic by using another method.

3. Target Steering Vector Estimation

The first electronic device 100 may estimate the target steering vector based on the coordinate information of the first microphone array and a sound propagation model. The target steering vector may be used to represent a direction of the target sound signal. In a possible implementation, the target steering vector may be determined by using different delay times of arrival of the target sound signal at each microphone in the first microphone array. For the foregoing target steering vector estimation method, refer to a method for estimating a target steering vector in an existing spatial filtering technology. Details are not described herein again.

In some embodiments, the first electronic device 100 may further use a subspace projection method to improve precision of the target steering vector. Improving precision of the target steering vector helps the first electronic device 100 more accurately distinguish between the direction of the target sound signal and a direction of the ambient noise signal.

The target steering vector estimation may be used to reduce impact of the ambient noise at a same frequency point as the target sound on suppressing ambient noise by the spatial filter, thereby improving an effect of spatial filtering.

4. Spatial Filter Determining

A spatial filter may be used to process a plurality of microphone signals (that is, the joint microphone array signal), suppress a signal in a non-target direction (that is, the ambient noise signal), and enhance a signal in a target direction (that is, the target sound signal). The first electronic device 100 may determine the spatial filter by using a method such as a minimum variance distortionless response (minimum variance distortionless response, MVDR) beamforming algorithm, a linearly constrained minimum variance (linearly constrained minimum variance, LCMV) beamforming algorithm, or a generalized sidelobe canceller (generalized sidelobe canceller, GSC). A specific method for determining the spatial filter is not limited in this embodiment of this application.

For example, the first electronic device 100 may determine a control filter by using the MVDR beamforming algorithm. A principle of the method is to select a proper filter parameter under a constraint condition that a desired signal has no distortion, to minimize average power output by the joint microphone array signal. The first electronic device 100 may determine an optimal spatial filter by using the noise spatial characteristic and the target steering vector. The optimal spatial filter can minimize impact of the ambient noise signal under a constraint condition that the target steering vector passes through without distortion. The spatial filter may be designed according to the following formula (6):

$$w(f) = \frac{R_t^{-1}(f) * a_t(f)}{a_t^H(f) * R_t^{-1}(f) * a_t(f)}, \quad (6)$$

where
w(f) is an optimal filtering weight coefficient of the spatial filter, and $R_t(f)$ and $a_t(f)$ are respectively a noise covariance matrix and a target steering vector of a time point t and a frequency point f.

When the foregoing optimal spatial filter is obtained, the first electronic device 100 may input the joint microphone array signal into the optimal spatial filter for spatial filtering. The first electronic device 100 may obtain a result audio signal by using the spatial filter. The result audio signal is an audio signal obtained after the target sound signal in the joint microphone array signal is enhanced and the ambient noise in the joint microphone array signal is suppressed.

In some embodiments, the foregoing spatial filtering process may be completed by the spatial filtering module 216D shown in FIG. 4, The following describes a method for turning on a first microphone array according to an embodiment of this application.

The first microphone array may include a first microphone in a first electronic device 100, a second microphone in a left-ear TWS earphone 201, and a third microphone in a right-ear TWS earphone 202. Before the first microphone array performs sound collecting, each of the left-ear TWS earphone 201 and the right-ear TWS earphone 202 establishes a Bluetooth connection to the first electronic device 100. Not limited to connection through Bluetooth, the TWS headset may alternatively establish a communication connection to the first electronic device 100 in another communication manner.

Figure 7A:
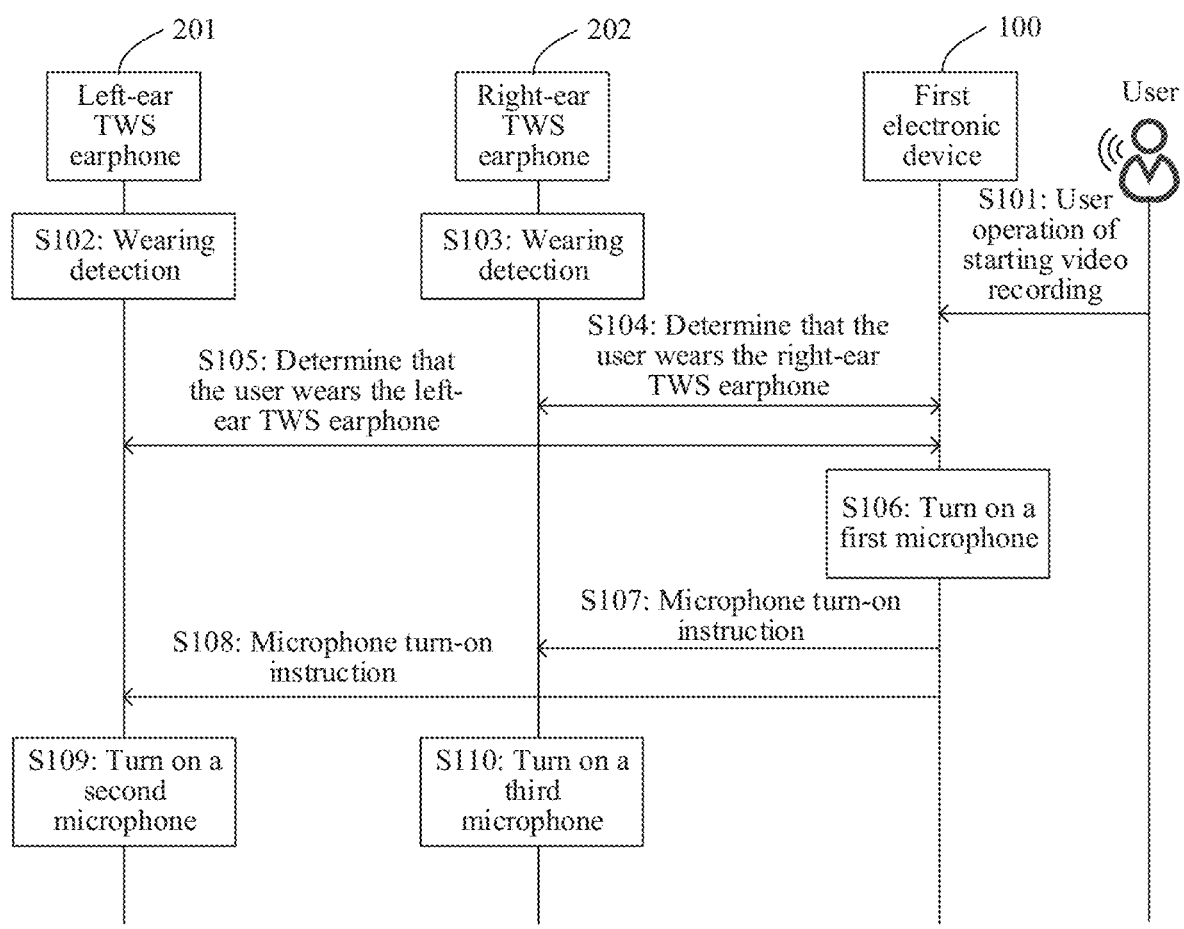
FIG. 7A is a flowchart of a method for turning on a first microphone array according to an embodiment of this application.

FIG. 7A is an example of a flowchart of a method for turning on a first microphone array. As shown in FIG. 7A, the method may include steps S101 to S110.

S101: A first electronic device 100 receives a user operation of starting video recording.

A user may use the first electronic device 100 to perform video recording in a scenario in which a front camera is used to record a video, such as live broadcast or vlog shooting. The first electronic device 100 may receive the user operation of starting video recording. The user operation of starting video recording may be, for example, a user operation performed on the video recording start control 326 as shown in FIG. 3F.

Before the user operation of starting video recording is received, the front camera of the first electronic device 100 is in an enabled state. The first electronic device 100 may display, in the preview box 323 shown in FIG. 3F, an image collected by the front camera in real time.

S102: A left-ear TWS earphone 201 performs wearing detection.

S103: A right-ear TWS earphone 202 performs wearing detection.

In some embodiments, each of the left-ear TWS earphone 201 and the right-ear TWS earphone 202 may include a wearing detection module. The wearing detection module may be configured to detect whether a user wears the TWS headset.

The wearing detection module may include a temperature sensor. The TWS headset may obtain a surface temperature of an earpiece of the TWS headset by using an optical proximity sensor. When detecting that the surface temperature of the earpiece of the TWS headset exceeds a preset value, the TWS headset may determine that the user wears the TWS headset. In this way, the TWS headset can implement wearing detection by using the temperature sensor. When detecting the TWS headset detects that the user wears the TWS headset, the TWS headset may wake up a main processor, to implement functions such as playing music and collecting a sound. When detecting that the user does not wear the TWS headset, the TWS headset may control the main processor and components such as a speaker and a microphone to be in a sleep state. This can reduce power consumption of the TWS headset.

In addition to the foregoing method for performing wearing detection by using the temperature sensor, the TWS headset may alternatively perform wearing detection by using an optical proximity sensor, a motion sensor, a pressure sensor, or the like. A method for performing wearing detection by the TWS headset is not limited in this embodiment of this application.

S104: The first electronic device TOO determines that the user wears the right-ear TWS earphone 202.

S105: The first electronic device 100 determines that a user wears the left-ear TWS earphone 201.

When receiving the user operation of starting video recording in the foregoing step S101, the first electronic device 100 may send a message to the left-ear TWS earphone 201 and the right-ear TWS earphone 202, to query a wearing detection result. The left-ear TWS earphone 201 and the right-ear TWS earphone 202 may send the wearing detection result to the first electronic device 100. The first electronic device 100 may determine, based on the received wearing detection result, that the user wears the left-ear TWS earphone 201 and the right-ear TWS earphone 202.

An execution sequence of step S104 and step S105 is not limited in this embodiment of this application.

S106: The first electronic device 100 enables a first microphone.

When determining that the user wears the left-ear TWS earphone 201 and the right-ear TWS earphone 202, the first electronic device 100 may enable the first microphone to perform sound collecting.

S107: The first electronic device 100 sends a microphone turn-on instruction to the right-ear TWS earphone 202.

S108: The first electronic device 100 sends a microphone turn-on instruction to the left-ear TWS earphone 201.

When determining that the user wears the left-ear TWS earphone 201, the first electronic device 100 may further send the microphone turn-on instruction to the left-ear TWS earphone 201.

When determining that the user wears the right-ear TWS earphone 202, the first electronic device 100 may further send the microphone turn-on instruction to the right-ear TWS earphone 202.

An execution sequence of step S106, step S107, and step S108 is not limited in this embodiment of this application.

S109: The left-ear TWS earphone 201 turns on a second microphone.

When the wearing detection result indicates that the user wears the left-ear TWS earphone 201, and the left-ear TWS earphone 201 has received the microphone turn-on instruction from the first electronic device 100, the left-ear TWS earphone 201 may turn on the second microphone.

S110: The right-ear TWS earphone 202 turns on a third microphone.

When the wearing detection result indicates that the user wears the right-ear TWS earphone 202, and the right-ear TWS earphone 202 has received the microphone turn-on instruction from the first electronic device 100, the right-ear TWS earphone 202 may turn on the third microphone.

That is, when the user wears the left-ear TWS earphone 201 and the right-ear TWS earphone 202 and performs video recording by using the first electronic device 100, microphones configured to perform sound collecting may include the first microphone, the second microphone, and the third microphone. That is, the first microphone is turned on. This is not limited to the foregoing video recording scenario. A scenario in which the first microphone is turned on may alternatively be a scenario in which the user wears the left-ear TWS earphone 201 and the right-ear TWS earphone 202 and performs a video call by using the first electronic device 100, or the like.

In some embodiments, the left-ear TWS earphone 201 may turn on the second microphone when performing wearing detection and determining that the left-ear TWS earphone 201 is in an in-ear state. The right-ear TWS earphone 202 may turn on the third microphone when performing wearing detection and determining that the right-ear TWS earphone 202 is in the in-ear state. That is, the first electronic device 100 may not need to send the microphone turn-on instruction to the left-ear TWS earphone 201 and the right-ear TWS earphone 202.

Based on the method for turning on the first microphone array shown in FIG. 7A, the following describes a sound collecting method provided in an embodiment of this application.

Figure 7B:
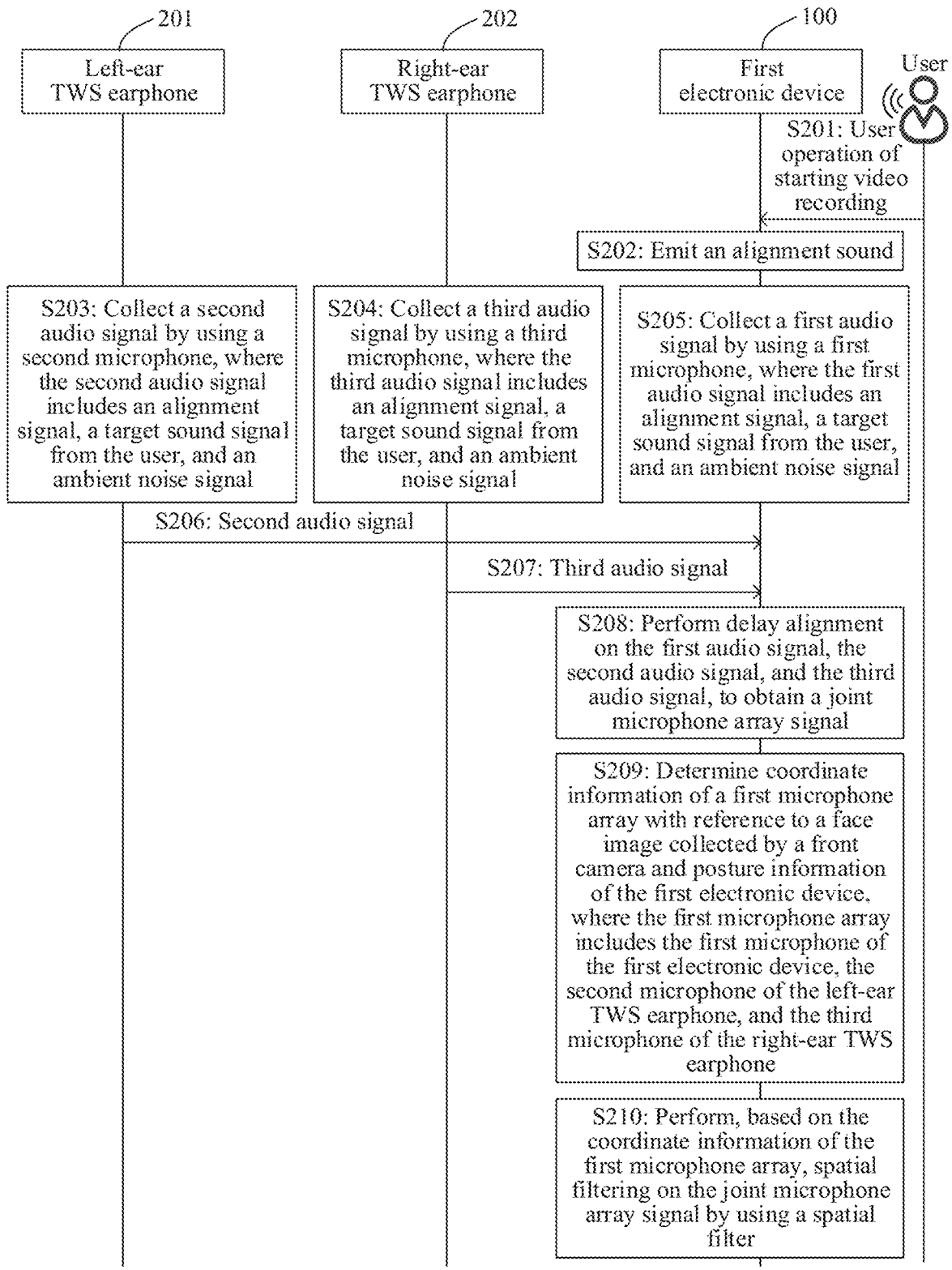
FIG. 7B is a flowchart of a sound collecting method according to an embodiment of this application.

FIG. 7B shows an example of a flowchart of a sound collecting method. As shown in FIG. 7B, the method may include steps S201 to S210. Steps S201 to S207 are a process of performing sound collecting by a first microphone array. Steps S208 to S210 are a process in which a first electronic device 100 processes an audio signal collected by the first microphone array.

1. (S201 to S207) The first microphone array performs sound collecting.

S201: The first electronic device 100 receives a user operation of starting video recording.

For the foregoing user operation of starting hiring, refer to the description of step S101 in FIG. 7A, Details are not described herein again.

S202: The first electronic device 100 emits an alignment sound.

For the alignment signal, refer to the description in the foregoing embodiments. Details are not described herein again.

S203: A left-ear TWS earphone 201 collects a second audio signal by using a second microphone, where the second audio signal includes an alignment signal, a target sound signal from a user, and an ambient noise signal.

S204: A right-ear TWS earphone 202 collects a third audio signal by using a third microphone, where the third audio signal includes an alignment signal, a target sound signal from the user, and an ambient noise signal.

S205: The first electronic device 100 collects a first audio signal by using a first microphone, where the first audio signal includes an alignment signal, a target sound signal from the user, and an ambient noise signal.

In a process in which the first electronic device 100 turns on a front camera to record a video, sounds near the first electronic device 100, the left-ear TWS earphone 201, and the right-ear TWS earphone 202 may include an alignment sound, a user voice, a sound of playing a musical instrument by the user, and ambient noise. The target sound collected by the first microphone array includes the user voice and the sound of playing the musical instrument by the user. The target sound is a sound that is reserved and that is clearly recorded in the video that is expected to be recorded. The ambient noise is a sound that is not expected to be recorded.

All of the first microphone, the second microphone, and the third microphone may collect sounds near the first electronic device 100, the left-ear TWS earphone 201, and the right-ear TWS earphone 202. The first microphone, the second microphone, and the third microphone may send the sound collected by the first microphone, the second microphone, and the third microphone to a related audio processing module (for example, an ADC) for processing, and respectively obtain the first audio signal, the second audio signal, and the third audio signal.

S206: The left-ear TWS earphone 201 may send the second audio signal to the first electronic device 100 through Bluetooth.

S207: The right-ear TWS earphone 202 may send the third audio signal to the first electronic device 100 through Bluetooth.

2. (S208 to S210) The first electronic device 100 processes the audio signal collected by the first microphone array.

S208: The first electronic device 100 performs delay alignment on the first audio signal, the second audio signal, and the third audio signal, to obtain a joint microphone array signal.

S209: The first electronic device 100 determines coordinate information of the first microphone array with reference to a face image collected by a front camera and posture information of the first electronic device 100.

S210: The first electronic device 100 performs, based on the coordinate information of the first microphone array, spatial filtering on the joint microphone array signal by using a spatial filter.

When obtaining a result audio signal obtained after spatial filtering, the first electronic device 100 may mix the result audio signal with a video captured by a camera in a process from starting video recording to ending video recording. The first electronic device 100 may determine a delay length of the foregoing result audio signal and the video based on a time point at which any one or more microphones in the first microphone array start to perform sound collecting and a time point at which the camera of the first electronic device 100 starts to perform image collecting. According to the delay length of the result audio signal and the video, the first electronic device 100 may ensure that a result audio signal and the video are aligned in time when mixing the result audio signal and the video. A method for performing delay alignment processing on the result audio signal and the video by the first electronic device 100 is not limited in this embodiment of this application.

Further, the first electronic device 100 may locally store mixed audio and video data or upload the mixed audio and video data to a cloud server.

For implementation methods of steps S208 to S210, refer to the description in the foregoing embodiment. Details are not described herein again.

It should be noted that, in some embodiments, the first electronic device 100 may determine the coordinate information of the first microphone array by using a face image collected within a preset time period after video recording starts and the posture information of the first electronic device 100. The first electronic device 100 may store the coordinate information of the first microphone array, and use the coordinate information of the first microphone array when performing spatial filtering on the joint microphone array signal in the video recording process. That is, the first electronic device 100 may not repeatedly measure the coordinate information of the first microphone array in one video recording process. This can reduce power consumption of the first electronic device 100. In addition, in one video recording process, a distance and a direction between the user wearing the TWS headset and the first electronic device 100 generally do not change greatly. That the first electronic device 100 uses the coordinate information of the first microphone array determined in the preset time period after the video recording starts as the coordinate information of the first microphone array in the video recording process has little impact on an effect of enhancing the target sound and suppressing the ambient noise.

In some other embodiments, the first electronic device 100 may determine the coordinate information of the first microphone array by using a face image collected within a preset time period after video recording starts and the posture information of the first electronic device 100. In a subsequent phase of the video recording, the first electronic device 100 may determine a distance and a direction between the user and the first electronic device 100 at intervals of a fixed time period. If the first electronic device 100 determines that a variation of the distance and the direction between the user and the first electronic device 100 exceeds a preset variation, the first electronic device 100 may re-determine the coordinate information of the first microphone array based on the face image currently collected by the front camera and the posture information of the first electronic device 100. Further, the first electronic device 100 may perform spatial filtering on the joint microphone array signal by using the re-determined coordinate information of the first microphone array. If the first electronic device 100 determines that the variation of the distance and the direction between the user and the first electronic device 100 does not exceed the preset variation, the first electronic device 100 may continue to perform spatial filtering on the joint microphone array signals by using the currently stored coordinate information of the first microphone array. The foregoing method reduces a quantity of times that the first electronic device 100 determines the coordinate information of the first microphone array reduces power consumption of the first electronic device 100, and reduces impact of a change of the coordinate information of the first microphone array on spatial filtering in a video recording process.

The first electronic device 100 may determine the variation of the distance and the direction between the user and the first electronic device 100 by detecting a change of a size and a location of a face box in an image collected by the front camera. Optionally, the first electronic device 100 may further determine the variation of the distance and the direction between the user and the first electronic device 100 in a manner such as using an optical proximity sensor or sound wave ranging. This is not limited in this embodiment of this application.

It can be learned from the sound collecting method shown in FIG. 7B that, when recording a video in a case in which a communication connection is established between the first electronic device 100 and the TWS headset, the first electronic device 100 may still turn on the microphone of the first electronic device 100 to perform sound collecting. The microphone of the first electronic device 100 and the microphone of the TWS headset may form the first microphone array. A near field area formed by the first microphone array includes an area in which a user wearing the TWS headset and the first electronic device 100 are located. Compared with a microphone array formed by only microphones of a TWS headset, the first microphone array has a larger size and a stronger spatial resolution capability, and can more accurately distinguish a target sound from a user in the near field area and ambient noise from a far field area. In this way, the first electronic device 100 can better enhance the target sound and suppress the ambient noise when performing spatial filtering on the audio signal collected by the first microphone array, to improve sound quality in a recorded video.

In addition, adding the microphone in the first electronic device 100 to the microphone array can reduce impact of a posture of wearing the TWS headset by the user on enhancing the target sound and reducing the ambient noise by the first electronic device 100.

The sound collecting method provided in this application is particularly applicable to a scenario in which a user wearing a TWS headset performs video recording by using the first electronic device 100 for live broadcast, vlog shooting, or the like. In addition to the foregoing video recording scenario, the voice collection method provided in this application may be alternatively applied to another scenario such as a video call.

In some embodiments, a microphone of one of the left-ear TWS earphone 201 and the right-ear TWS earphone 202 may form a microphone array with the microphone of the first electronic device 100. The microphone array may also be applicable to the sound collecting method provided in embodiments of this application. For example, in a scenario in which the user wears the left-ear TWS earphone 201 and the right-ear TWS earphone 202 and uses the first electronic device 100 for live broadcast, the first microphone of the first electronic device 100 and the second microphone of the left-ear TWS earphone 201 may perform sound collecting. The first electronic device 100 may obtain the first audio signal by using the first microphone. The left-ear TWS earphone 201 may obtain the second audio signal by using the second microphone. The left-ear TWS earphone 201 may send the second audio signal to the first electronic device 100. The first electronic device 100 may perform noise reduction processing on the first audio signal and the second audio signal, to obtain an audio signal in a live video.

A near field area of the microphone array formed by the microphone of one earphone and the microphone of the first electronic device 100 may still include a location of a sound source of a target sound, such as a user voice or a sound of playing a musical instrument by the user. In addition, using the microphone of one earphone can reduce power consumption of the headset.

In some embodiments, an image captured by a camera of the first electronic device 100 includes a plurality of faces. That is, a plurality of users jointly use the first electronic device 100 to perform video recording. One of the plurality of users wears the TWS headset. The TWS headset establishes a communication connection to the first electronic device 100. The near field area of the first microphone array formed by the microphone of the first electronic device 100 and the microphone of the TWS headset may generally cover an area in which the plurality of users are located. In this case, a sound in the near field area of the first microphone array may include both voices of the plurality of users and sounds of playing musical instruments by the plurality of users. That is, when the first electronic device 100 performs spatial filtering on the joint microphone array signal collected by the first microphone array, the voice of the user wearing the TWS headset and the sound of playing a musical instrument by the user can be enhanced, and a voice of another user performing video recording and a sound of playing a musical instrument by the another user can be enhanced. This can improve sound quality of a video recorded by a plurality of persons.

Figure 8:
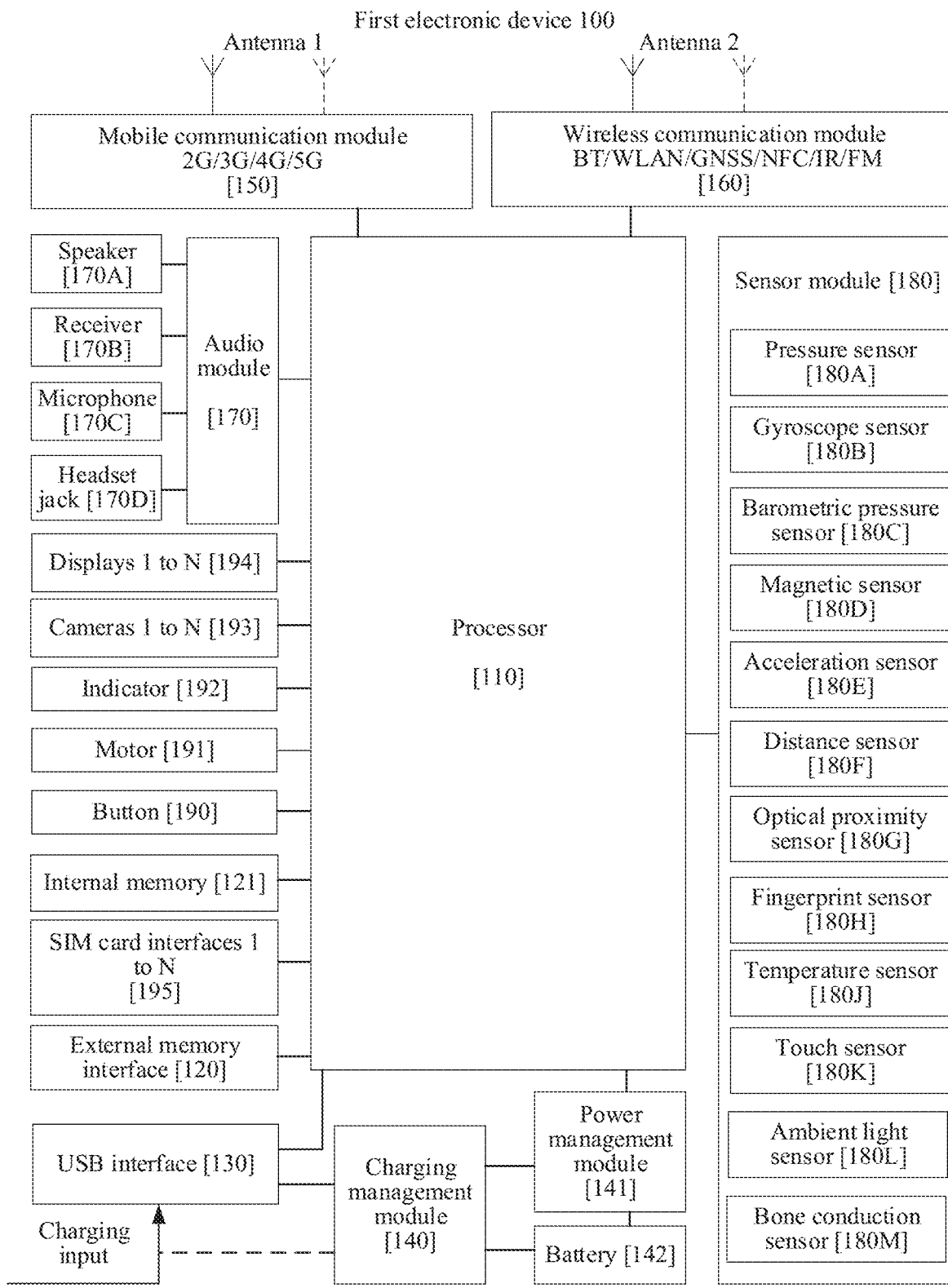
FIG. 8 is a schematic diagram of a structure of a first electronic device 100 according to an embodiment of this application.

FIG. 8 shows an example of a schematic diagram of a structure of a first electronic device 100.

A first electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the first electronic device 100. In some other embodiments of this application, the first electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data. from the memory. This avoids repeated access, reduces waiting time of the processor 110, and improves system efficiency.

The charging management module 140 is configured to receive a charging input from a charger.

The power management module 141 is configured to connect the battery 142 and the charging management module 140 to the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the first electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the first electronic device 100 may be configured to cover one or more communication bands.

The mobile communication module 150 can provide a wireless communication solution that is applied to the first electronic device 100 and that includes 2G/3G/4G/5G or the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the first electronic device 100. The wireless communication module 160 may be one or more components integrating at least one communications processor module. The wireless communication module 160 receives an electromagnetic wave through the antenna 2, performs frequency modulation and filtering processing on an electromagnetic wave signal, and transmits a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

The first electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. In some embodiments, the first electronic device 100 may include one or N displays 194, where N is a positive integer greater than 1.

The first electronic device 100 may implement a photographing function by using the ISP, the camera 193, the video codec, the GPU, the display 194, the application processor, and the like.

The ISP is configured to process data fed back the camera 193. For example, during photographing, a shutter is pressed and light is transmitted to a photosensitive element of the camera through a lens. An optical signal is converted into an electrical signal, and the photosensitive element of the camera transmits the electrical signal to the ISP for processing, to convert the electrical signal into a visible image. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the first electronic device 100 may include one or N cameras 193, where N is a positive integer greater than 1.

In this application, the camera 213 shown in FIG. 4 is the front camera in the camera 193 in FIG. 8. An image collected by the camera 213 may be converted into a digital image signal by the ADC 215C and output to the DSP. The ADC 215C may be an analog to digital converter integrated into the ISP.

The DSP is configured to process a digital signal, for example, a digital signal such as a digital image signal or a digital audio signal. For example, when the first electronic device 100 selects a frequency point, the digital signal processor is configured to perform Fourier transformation on frequency energy.

In some embodiments of this application, the DSP may include a signal generator, a delay alignment module, a coordinate resolving module, and a spatial filtering module. For functions of the signal generator, the delay alignment module, the coordinate resolving module, and the spatial filtering module, refer to the description of the embodiment in FIG. 4. Details are not described herein again.

The signal generator, the delay alignment module, the coordinate resolving module, and the spatial filtering module may be integrated into another chip processor separately or together, and are not limited to being integrated into the DSP. This is not limited in this embodiment of this application.

The video codec is configured to compress or decompress a digital video. The first electronic device 100 may support one or more video codecs. In this way, the first electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the first electronic device 100 may be implemented through the NPU, for example, image recognition, facial recognition, speech recognition, and voice activity detection.

The external memory interface 120 may be configured to connect to an external memory card, for example, a micro SD card, to expand a storage capability of the first electronic device 100.

The internal memory 121 may be configured to store computer-executable program code. The executable program code includes instructions. The processor 110 executes various function applications and data processing of the first electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (such as audio data) created during use of the first electronic device 100. In addition, the internal memory 121 may include a high-speed random access memory, and may further include a nonvolatile memory, for example, at least one magnetic disk storage device, a flash storage device, a universal flash storage (universal flash storage, UFS), and the like.

The first electronic device 100 may implement audio functions such as music playing and recording by using the audio module 170, the speaker 170A, the receiver 170B, the microphone 170C, the headset jack 170D, the application processor, and the like.

The audio module 170 is configured to convert a digital audio signal into an analog audio signal for output, and is also configured to convert analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The first electronic device 100 may be used to listen to music or answer a call in a hands-free mode through the speaker 170A.

The receiver 170B, also referred to as an "earpiece", is configured to convert an electrical audio signal into a sound signal. When a call is answered or voice information is received through the first electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 1700 through the mouth of the user, to input a sound signal to the microphone 170C. At least one microphone 170C may be disposed in the first electronic device 100. In some other embodiments, two microphones 170C may be disposed in the first electronic device 100, to collect a sound signal and implement a noise reduction function. In some other embodiments, three, four, or more microphones 170C may alternatively be disposed in the first electronic device 100, to collect a sound signal, implement noise reduction, and identify a sound source, to implement a directional recording function and the like.

The microphone 170C is the first microphone 211 in the foregoing embodiment.

The headset jack 170D is configured to connect to a wired headset.

In this application, the signal generator of the first electronic device 100 may generate an alignment signal. The alignment signal is a digital audio signal. The signal generator may send the alignment signal to the DAC 215A. The DAC 215A may convert the alignment signal into an analog audio signal. The DAC 215A may be integrated into the audio module 170.

A sound collected by the first microphone 211 is an analog audio signal. The first microphone 211 may send the collected sound to the ADC 215B. The ADC 215B may convert the analog audio signal into a digital audio signal. The ADC 215B may be integrated into the audio module 170.

The pressure sensor 180A is configured to sense a pressure signal, and can convert the pressure signal into an electrical signal. In some embodiments, the pressure sensor 180A may be disposed on the display 194.

The gyroscope sensor 180B may be configured to determine a moving posture of the first electronic device 100. In some embodiments, an angular velocity of the first electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the first electronic device 100 jitters, obtains, through calculation based on the angle, a distance for which a lens module needs to compensate, and allows the lens to cancel a jitter of the first electronic device 100 through reverse motion, to implement image stabilization. The gyroscope sensor 180B may also be used in a navigation scenario and a somatic game scenario.

The barometric pressure sensor 180C is configured to measure barometric pressure.

The magnetic sensor 180D includes a Hall sensor. The first electronic device 100 may detect opening and closing of a flip cover by using the magnetic sensor 180D.

The acceleration sensor 180E may detect accelerations in various directions (usually on three axes) of the first electronic device 100. When the first electronic device 100 is still, a magnitude and a direction of gravity may be detected. The acceleration sensor may be further configured to identify a posture of the first electronic device 100, and is applied to an application such as landscape/portrait mode switching and a pedometer.

The gyroscope sensor 180B and the acceleration sensor 180E may be the posture sensor 214 in the foregoing embodiment.

The distance sensor 180F is configured to measure a distance. The first electronic device 100 may measure the distance through infrared or a laser. In some embodiments, in an image shooting scenario, the first electronic device 100 may measure a distance by using the distance sensor 180F to implement quick focusing.

The optical proximity sensor 180G may include, for example, a light-emitting diode (LED), and an optical detector, for example, a photodiode. The light emitting diode may be an infrared light emitting diode. The first electronic device 100 emits infrared light through the light-emitting diode. The first electronic device 100 detects infrared reflected light from a nearby object through the photodiode. When detecting sufficient reflected light, the first electronic device 100 may determine that there is an object near the first electronic device 100. When detecting insufficient reflected light, the first electronic device 100 may determine that there is no object near the first electronic device 100. The first electronic device 100 may detect, through the optical proximity sensor 180G, that the user holds the first electronic device 100 close to an ear during a call, so that the first electronic device 100 automatically turns off a screen for power saving.

The ambient light sensor 180L is configured to sense ambient light brightness. The first electronic device 100 may adaptively adjust brightness of the display 194 based on the sensed ambient light brightness.

The fingerprint sensor 180H is configured to collect a fingerprint. The first electronic device 100 may use a feature of the collected fingerprint to implement fingerprint-based unlocking, application lock accessing, fingerprint-based photographing, fingerprint-based call answering, and the like.

The temperature sensor 180J is configured to detect a temperature. In some embodiments, the first electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194.

The bone conduction sensor 180M may obtain a vibration signal.

The button 190 includes a power button, a volume button, and the like. The button 190 may be a mechanical button, or may be a touch button.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with and separation from the first electronic device 100.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method implemented by a first electronic device, wherein the method comprises:
    collecting a face image;
    determining relative locations of a first microphone, a second microphone, and a third microphone of the first electronic device based on the face image and posture information of the first electronic device;
    obtaining a first audio signal of the first microphone, a second audio signal of the second microphone, and a third audio signal of the third microphone; and
    performing noise reduction processing on the first audio signal, the second audio signal, and the third audio signal based on the relative locations.

2. The method according to claim 1, wherein, before performing the noise reduction processing, the method further comprises:
    generating an alignment signal;
    performing digital-to-analog conversion on the alignment signal to obtain an alignment sound;
    emitting the alignment sound;
    further obtaining the first audio signal, the second audio signal, and the third audio signal by detecting a sound, wherein the sound includes the alignment sound;
    performing delay correlation detection on a first alignment signal part of the first audio signal, a second alignment signal part of the second audio signal, and a third alignment signal part of the third audio signal to determine delay lengths between the first audio signal, the second audio signal, and the third audio signal; and
    performing delay alignment on the first audio signal, the second audio signal, and the third audio signal based on the delay lengths.

3. The method according to claim 2, wherein the alignment signal is an audio signal with a frequency higher than 20000 Hertz (Hz).

4. The method according to claim 1, wherein determining the relative locations comprises:
    determining a standard head coordinate system based on a standard head model;
    storing coordinates in key points of the standard head model in the standard head coordinate system;
    determining a first conversion relationship between the standard head coordinate system and a first electronic device coordinate system based on a correspondence between first coordinates of a first human face key point in the standard head coordinate system and second coordinates of the first human face key point in a face image coordinate system;
    determining third coordinates of a left ear and a right ear in the standard head model in the first electronic device coordinate system based on the first conversion relationship and fourth coordinates of the left ear and the right ear in the standard head model in the standard head coordinate system, wherein the third coordinates are respectively fifth coordinates of the second microphone and the third microphone in the first electronic device coordinate system;
    determining a second conversion relationship between the first electronic device coordinate system and a world coordinate system based on the posture information; and
    determining the relative locations based on the second conversion relationship and seventh coordinates of the first microphone, the second microphone, and the third microphone in the first electronic device coordinate system, wherein the relative locations comprise eighth coordinates of the first microphone, the second microphone, and the third microphone in the world coordinate system.

5. The method according to claim 1, wherein performing the noise reduction processing comprises:
    performing voice activity detection on the first audio signal, the second audio signal, and the third audio signal based on the relative locations;
    determining, using the voice activity detection, a first frequency point of a target sound signal and a second frequency point of an ambient noise signal in the first audio signal, the second audio signal, and the third audio signal, wherein the target sound signal is a sound signal of a sound source located in a near field area of a microphone array formed by the first microphone, the second microphone, and the third microphone;
    updating a noise spatial characteristic of ambient noise based on the first frequency point and the second frequency point, wherein the noise spatial characteristic indicates a spatial distribution of the ambient noise, and wherein the spatial distribution comprises a direction and energy of the ambient noise;
    determining a target steering vector of the first audio signal, the second audio signal, and the third audio signal based on the relative locations, wherein the target steering vector indicates a direction of the target sound signal;
    determining a spatial filter based on the noise spatial characteristic and the target steering vector; and
    performing spatial filtering on the first audio signal, the second audio signal, and the third audio signal using the spatial filter.

6. The method according to claim 1, wherein the method further comprises:
    performing, using a left-ear wireless earphone of the first electronic device, first wearing detection to determine whether the left-ear wireless earphone is in an in-ear state;
    obtaining, when the left-ear wireless earphone is in the in-ear state, the second audio signal using the second microphone;
    performing, using a right-ear wireless earphone, second wearing detection to determine whether the right-ear wireless earphone is in an in-ear state; and
    obtaining, when the right-ear wireless earphone is in the in-ear state, the third audio signal using the third microphone.

7. The method according to claim 1, wherein the method further comprises:

obtaining the first audio signal, the second audio signal, and the third audio signal in a first time period using the first microphone, the second microphone, and the third microphone, respectively;

obtaining a fourth audio signal after performing the noise reduction processing; and mixing a first video and the fourth audio signal that are collected in the first time period.

8. A sound collecting method performed by a first electronic device wherein the method comprises:

collecting face image;

determining relative locations of a first microphone, a second microphone, and a third microphone of the first electronic device based on the face image and posture information of the first electronic device;

obtaining a first audio signal of the first microphone, a second audio signal of the second microphone, and a third audio signal of the third microphone;

generating an alignment signal;

performing a delay alignment on the first audio signal, the second audio signal, and the third audio signal based on the alignment signal; and further performing noise reduction processing on the first audio signal, the second audio signal, and the third audio signal based on the relative locations.

9. The sound collecting method according to claim 8, wherein performing the delay alignment comprises:

performing digital-to-analog conversion on the alignment signal to obtain an alignment sound;

emitting the alignment sound;

further obtaining the first audio signal, the second audio signal, and the third audio signal by detecting a sound, wherein the sound includes the alignment sound;

performing a delay correlation detection on a first alignment signal part of the first audio signal, a second alignment signal part of the second audio signal, and a third alignment signal part of the third audio signal, to determine delay lengths between the first audio signal, the second audio signal, and the third audio signal; and performing a delay alignment on the first audio signal, the second audio signal, and the third audio signal based on the delay lengths.

10. The sound collecting method according to claim 9, wherein the alignment signal is an audio signal with a frequency higher than 20000 Hertz (Hz).

11. The sound collecting method according to claim 8, wherein determining the relative locations comprises:

determining a standard head coordinate system based on a standard head model;

storing coordinates in key points of the standard head model in the standard head coordinate system;

determining a first conversion relationship between the standard head coordinate system and a first electronic device coordinate system based on a correspondence between first coordinates of a first human face key point in the standard head coordinate system and second coordinates of the first human face key point in a face image coordinate system;

determining third coordinates of a left ear and a right ear in the standard head model in the first electronic device coordinate system based on the first conversion relationship and fourth coordinates of the left ear and the right ear in the standard head model in the standard head coordinate system, wherein the third coordinates are respectively fifth coordinates of the second microphone and the third microphone in the first electronic device coordinate system;

determining a second conversion relationship between the first electronic device coordinate system and a world coordinate system based on the posture information; and determining the relative locations based on the second conversion relationship and seventh coordinates of the first microphone, the second microphone, and the third microphone in the first electronic device coordinate system, wherein the relative locations comprise eighth coordinates of the first microphone, the second microphone, and the third microphone in the world coordinate system.

12. The sound collecting method according to claim 8, wherein performing the noise reduction processing comprises:

performing voice activity detection on the first audio signal, the second audio signal, and the third audio signal based on the relative locations;

determining, using the voice activity detection, a first frequency point of a target sound signal and a second frequency point of an ambient noise signal in the first audio signal, the second audio signal, and the third audio signal, wherein the target sound signal is a sound signal of a sound source located in a near field area of a microphone array formed by the first microphone, the second microphone, and the third microphone;

updating a noise spatial characteristic of ambient noise based on the first frequency point and the second frequency point, wherein the noise spatial characteristic indicates a spatial distribution of the ambient noise, and wherein the spatial distribution comprises a direction and energy of the ambient noise;

determining a target steering vector of the first audio signal, the second audio signal, and the third audio signal based on the relative locations, wherein the target steering vector indicates a direction of the target sound signal;

determining a spatial filter based on the noise spatial characteristic and the target steering vector; and performing spatial filtering on the first audio signal, the second audio signal, and the third audio signal using the spatial filter.

13. The sound collecting method according to claim 8, wherein the method further comprises:

obtaining the first audio signal, the second audio signal, and the third audio signal in a first time period using the first microphone, the second microphone, and the third microphone, respectively;

obtaining a fourth audio signal after performing the noise reduction processing; and mixing a first video and the fourth audio signal that are collected in the first time period.

14. The sound collecting method according to claim 8, wherein the delay alignment is performed before the noise reduction processing on the first audio signal, the second audio signal, and the third audio signal.

15. The sound collecting method according to claim 8, wherein the method further comprises:

performing, using a left-ear wireless earphone of the first electronic device, wearing detection to determine whether the left-ear wireless earphone is in an in-ear state;

obtaining, when the left-ear wireless earphone is in the in-ear state, the second audio signal using the second microphone;

performing, using a right-ear wireless earphone, second wearing detection to determine whether the right-ear wireless earphone is in an in-ear state; and obtaining, when the right-ear wireless earphone is in the in-ear state, the third audio signal using the third microphone.

16. An electronic device comprising:

a memory configured to store computer instructions; and a processor coupled to the memory and configured to invoke the computer instructions to cause the electronic device to:

collect a face image;

determine relative locations of a first microphone, a second microphone, and a third microphone based on the face image and posture information of the first electronic device;

obtain a first audio signal of the first microphone, a second audio signal of the second microphone, and a third audio signal of the third microphone; and perform noise reduction processing on the first audio signal, the second audio signal, and the third audio signal based on the relative locations.

17. The electronic device according to claim 16, wherein, when executed by the processor, the computer instructions further cause the electronic device to:

generate an alignment signal;

perform digital-to-analog conversion on the alignment signal to obtain an alignment sound;

emit the alignment sound; and further obtain the first audio signal, the second audio signal, and the third audio signal by detecting a sound, wherein the sound includes the alignment sound;

perform delay correlation detection on a first alignment signal part of the first audio signal, a second alignment signal part of the second audio signal, and a third alignment signal part of the third audio signal to determine delay lengths between the first audio signal, the second audio signal, and the third audio signal; and perform delay alignment on the first audio signal, the second audio signal, and the third audio signal based on the delay lengths.

18. The electronic device according to claim 16, wherein, when executed by the processor, the computer instructions further cause the electronic device to:

obtain the first audio signal, the second audio signal, and the third audio signal in a first time period using the first microphone, the second microphone, and the third microphone, respectively;

obtain a fourth audio signal after performing the noise reduction processing; and mix a first video and the fourth audio signal that are collected in the first time period.

19. The electronic device according to claim 16, wherein the computer instructions to perform the noise reduction processing further comprises instructions, when executed by the processor, cause the electronic device to:

perform voice activity detection on the first audio signal, the second audio signal, and the third audio signal based on the relative locations;

determine, using the voice activity detection, a first frequency point of a target sound signal and a second frequency point of an ambient noise signal in the first audio signal, the second audio signal, and the third audio signal, wherein the target sound signal is a sound signal of a sound source located in a near field area of a microphone array formed by the first microphone, the second microphone, and the third microphone; and update a noise spatial characteristic of ambient noise based on the first frequency point and the second frequency point, wherein the noise spatial characteristic indicates a spatial distribution of the ambient noise, and wherein the spatial distribution comprises a direction and energy of the ambient noise.

20. The electronic device according to claim 19, wherein the computer instructions to perform the noise reduction processing further comprises instructions, when executed by the processor, cause the electronic device to:

determine a target steering vector of the first audio signal, the second audio signal, and the third audio signal based on the relative locations, wherein the target steering vector indicates a direction of the target sound signal;

determine a spatial filter based on the noise spatial characteristic and the target steering vector; and perform spatial filtering on the first audio signal, the second audio signal, and the third audio signal using the spatial filter.

\* \* \* \* \*